US012699964B1

(12) United States Patent
Dimson et al.

(10) Patent No.: US 12,699,964 B1
(45) Date of Patent: Aug. 4, 2026

(54) PROJECT MANAGEMENT FOR GENERATIVE RESPONSE ENGINE CONTEXTS

(71) Applicant: OpenAI OpCo, LLC., San Francisco, CA (US)

(72) Inventors: Thomas Dimson, San Francisco, CA (US); Drew Schuster, San Francisco, CA (US)

(73) Assignee: OpenAI OpCo, LLC, San Francisco, CA (US)

( * ) Notice: Subject to any disclaimer, the term of this patent is extended or adjusted under 35 U.S.C. 154(b) by 0 days.

(21) Appl. No.: 19/202,262

(22) Filed: May 8, 2025

(51) Int. Cl.
G06Q 10/10 (2023.01)
G06F 21/62 (2013.01)

(52) U.S. Cl.
CPC ....... G06Q 10/103 (2013.01); G06F 21/6218 (2013.01)

(58) Field of Classification Search
CPC .......................... G06Q 10/103; G06F 21/6218
USPC ......................................................... 707/827
See application file for complete search history.

(56) References Cited

U.S. PATENT DOCUMENTS

| | | | | |
|---|---|---|---|---|
| 12,164,548 | B1 * | 12/2024 | Deutsch | G06F 16/3329 |
| 12,254,029 | B1 * | 3/2025 | Veillon | G06F 16/285 |
| 2007/0033200 | A1 * | 2/2007 | Gillespie | G06Q 10/10 |
| 2016/0352656 | A1 * | 12/2016 | Galley | H04L 51/02 |
| 2024/0289407 | A1 * | 8/2024 | Rofouei | G06F 16/9577 |
| 2025/0133038 | A1 * | 4/2025 | Shang | G10L 15/26 |
| 2025/0200361 | A1 * | 6/2025 | Chakka | G06N 3/08 |
| 2025/0217576 | A1 * | 7/2025 | Mann | G06F 16/243 |

* cited by examiner

*Primary Examiner* — Joshua Bullock
(74) *Attorney, Agent, or Firm* — Polsinelli PC

(57) ABSTRACT

The present technology pertains to managing contexts for generative response engines while enforcing a hierarchy of contexts based on the organization of the contexts into one or more smart folders. The present technology enables a user account to store at least two context items in a smart folder, where the context items may include instructions for a model, documents, or conversation threads. When a smart folder is selected by a user account, the at least two context items can be included in the context window to the generative response engine. A hierarchy of context items can be imputed by the generative response engine based on the structure of smart folders.

19 Claims, 10 Drawing Sheets

500

RECEIVE A SELECTION OF A SMART FOLDER BY A USER ACCOUNT, WHERE THE SMART FOLDER GROUPS AT LEAST TWO CONTEXT ITEMS THAT ARE USABLE BY THE GENERATIVE RESPONSE ENGINE IN RESPONDING TO PROMPTS 502

RECEIVE A PROMPT FROM THE USER ACCOUNT 504

SEND THE PROMPT AND THE AT LEAST TWO CONTEXT ITEMS TO THE GENERATIVE RESPONSE ENGINE 506

RECEIVE A RESPONSE OUTPUT BY THE GENERATIVE RESPONSE ENGINE BASED ON THE PROMPT AND THE AT LEAST TWO CONTEXT ITEMS 508

OUTPUT THE RESPONSE TO THE USER ACCOUNT AND APPEND THE RESPONSE TO A CONVERSATION THREAD 510

200

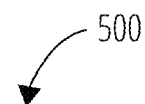

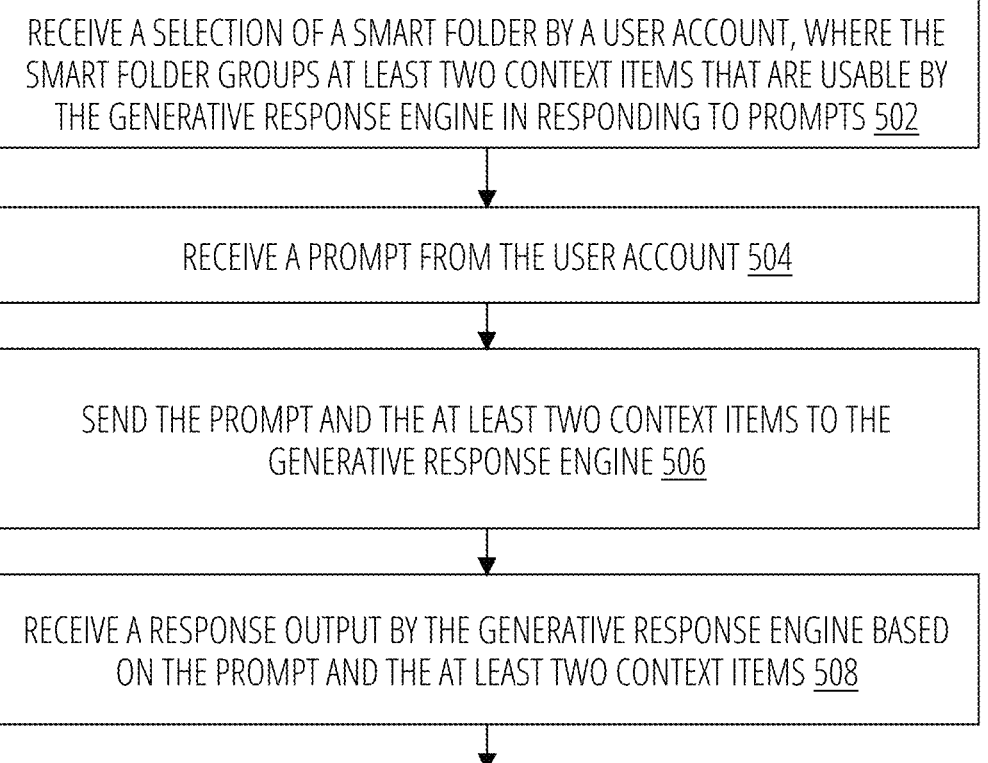

RECEIVE A SELECTION OF A SMART FOLDER BY A USER ACCOUNT, WHERE THE SMART FOLDER GROUPS AT LEAST TWO CONTEXT ITEMS THAT ARE USABLE BY THE GENERATIVE RESPONSE ENGINE IN RESPONDING TO PROMPTS <u>502</u>

RECEIVE A PROMPT FROM THE USER ACCOUNT <u>504</u>

SEND THE PROMPT AND THE AT LEAST TWO CONTEXT ITEMS TO THE GENERATIVE RESPONSE ENGINE <u>506</u>

RECEIVE A RESPONSE OUTPUT BY THE GENERATIVE RESPONSE ENGINE BASED ON THE PROMPT AND THE AT LEAST TWO CONTEXT ITEMS <u>508</u>

OUTPUT THE RESPONSE TO THE USER ACCOUNT AND APPEND THE RESPONSE TO A CONVERSATION THREAD <u>510</u>

FIG. 5

ENCODE BLOCK 710

DECODE BLOCK 714

PROJECT MANAGEMENT FOR GENERATIVE RESPONSE ENGINE CONTEXTS

BACKGROUND

Generative response engines such as large language models represent a significant milestone in the field of artificial intelligence, revolutionizing computer-based natural language understanding and generation. Generative response engines, powered by advanced deep learning techniques, have demonstrated astonishing capabilities in tasks such as text generation, translation, summarization, and even code generation. Generative response engines can sift through vast amounts of text data, extract context, and provide coherent responses to a wide array of queries.

BRIEF DESCRIPTION OF THE SEVERAL VIEWS OF THE DRAWINGS

Details of one or more aspects of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings, and the claims.

FIG. 5 illustrates an example method for using a smart folder to provide context to a generative response engine in accordance with some aspects of the present technology.

DETAILED DESCRIPTION

Figure 1:
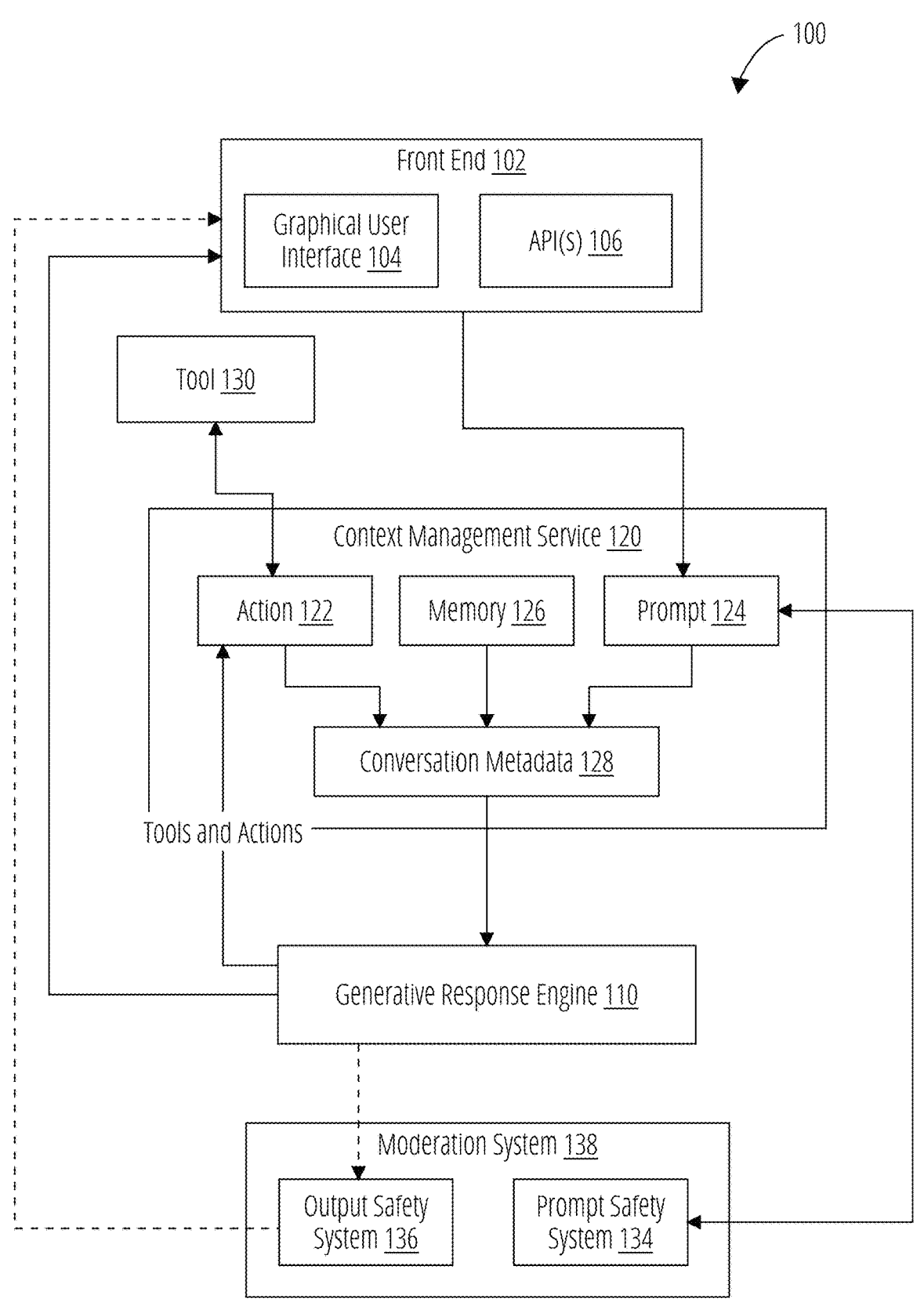
FIG. 1 illustrates an example system supporting a generative response engine during inference operations in accordance with some aspects of the present technology.

Various aspects of the disclosure are discussed in detail below. While specific implementations are discussed, it should be understood that this is done for illustration purposes only. A person skilled in the relevant art will recognize that other components and configurations may be used without parting from the spirit and scope of the disclosure.

Generative response engines such as large language models represent a significant milestone in the field of artificial intelligence, revolutionizing computer-based natural language understanding and generation. Generative response engines, powered by advanced deep learning techniques, have demonstrated astonishing capabilities in tasks such as text generation, translation, summarization, and even code generation.

User account interactions with a generative response engine can be organized into conversations. For example, the user account can engage in one or more conversations with the generative response engine, where a respective conversation may involve a particular topic or task. Each conversation may have a context that is built from the prompts and responses of the conversation. In some examples, the context can include documents provided to the generative response engine and/or documents created in response to prompts. Additional context can include instructions (e.g., for custom models) or knowledge bases (e.g., used for retrieval-augmented generation (RAG)). Accordingly, there are a number of context items (e.g., conversation threads, documents, files, instructions, knowledge bases, etc.) that can be generated or provided to the generative response engine to influence its output in response to prompts. However, due to the amount of context items and the different types of context items, it can be difficult to organize and retrieve contexts, or to share contexts between user accounts.

The present technology aims to address these and other challenges associated with organizing contexts of a generative response engine. For example, the present technology includes systems and methods for providing and organizing smart folders that can include context items such that the context items can be provided in the context window of the generative response engine upon selection of a smart folder. A context window is a critical component that allows the generative response engine to process and understand a specific segment of text or tokens simultaneously. This segment can include a variety of data types to provide comprehensive context, which enhances the generative response engine's ability to generate accurate and relevant responses. Examples of data that may be included within a context window are system instructions, which consist of guidelines or directives that shape the model's behavior; chat threads, which are previous turns in a conversation that provide continuity in dialogue; documents or portions thereof, which the model may reference or extract information from; results from tool calls, which supply outputs that the model can utilize for additional context; and user queries, which include current or past inquiries that guide ongoing interactions. The size and constitution of the context window are pivotal for enabling the language model to maintain coherence and relevance, thereby impacting its overall effectiveness in processing and generating text. In layman's terms, the context window includes all information that the generative response engine receives as input to guide an inference operation.

In some examples, the smart folders can further organize context items in a hierarchy imputed from the nesting structure of the smart folders. In one example, a smart folder may contain an instruction to the generative response engine. The smart folder may further include a sub-folder having its own instruction to the generative response engine. If a user account selects the sub-folder, both the instruction of the smart folder and the instruction of the sub-folder can be provided to the generative response engine. However, if the user account selects the smart folder, only the instruction of the smart folder is provided to the generative response engine. Accordingly, the smart folders can be used to hierarchically store context items for use by the generative response engine. The hierarchy of context items imputed from the smart folder organizational structure can facilitate organization of related contexts, such that context items are easily retrievable and explorable by the user account.

In one example, a wedding planner can create a smart folder storing context items. The context items can include, for example, template documents and instructions for a custom model. The smart folder can further include a sub-folder for a client of the wedding planner. The sub-folder can have access to the templates of the smart folder, but may also contain context items associated with the particular preferences of the client. The smart folder can also include a second sub-folder for a second client. This second sub-folder can contain context items associated with the second client. The second sub-folder may have access to the context items of the sub-folder, but not the context items of the first sub-folder. Thus, while working with the generative response engine in the context of the second sub-folder, the generative response engine can receive, in its context window, both the context items of the smart folder and the context items of the second sub-folder, thereby enabling the generative response engine to generate output tailored to the particular client that is also generated in light of the context items of the smart folder.

Further, the smart folders can facilitate collaboration between user accounts. Permission to use and/or edit a smart folder can be shared among user accounts. Thus, an owner of a smart folder can grant permission to use the smart folder to another user account. The other user account can then use the context items of the smart folder to inform or confine the output of the generative response engine. In one example, a professor can set up a custom model for use by students in a class project, where the custom model is associated with a set of instructions stored in a smart folder. The professor can then grant access permission to the smart folder to user accounts of the members of the class. Thus, a member of the class can access the smart folder and use the custom model for assignments, but may not edit or change the instructions for the custom model. Accordingly, the smart folders can facilitate collaboration through sharing of context items, allowing multiple user accounts to provide the generative response engine with the same context items.

Accordingly, aspects of the present technology address the need for methods for storing context items such that generative response engine contexts can be replicated across interactions with the generative response engine. The present technology further addresses privacy concerns by facilitating use of context items across user accounts, while supplementing the context items with a personalization state of the user account, without sharing the personalization state across user accounts.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

FIG. 1 illustrates an example AI assistant service supporting a generative response engine during inference operations in accordance with some aspects of the present technology. Although the example system depicts particular system components and an arrangement of such components, this depiction is to facilitate a discussion of the present technology and should not be considered limiting unless specified in the appended claims. For example, some components that are illustrated as separate can be combined with other components, and some components can be divided into separate components.

The generative response engine 110 is an artificial intelligence (AI) that can generate content in response to a prompt. The prompt can be from a human or a software entity (AI or applications). The prompt is generally in natural language but could be in code, including binary. Some examples of the generative response engine can include language models that generate language, such as CHATGPT, or other models, such as DALL-E, which generates images, and SORA, which generates videos. CHATGPT, DALL-E, and SORA are all provided by OPENAI, but the generative response engine is not limited to AI provided by OPENAI. The generative response engine can also be any type of generative AI and can include AI developed using various architectures such as diffusion models and transformers (e.g., autoregressive transformer architecture) and combinations of models.

In some instances, a language model, such as CHATGPT, can receive prompts to output images, video, code, applications, etc., which it can provide by interfacing with one or more other models, as will be addressed further herein.

Users and applications can interact with the generative response engine 110 through the front end 102. The front end 102 serves as the interface and intermediary between the user and the generative response engine. It encompasses the graphical user interface 104 and Application Programming Interfaces (APIs) 106 that facilitate communication, input processing, and output presentation. Generally, users interact through a graphical user interface 104 that often includes a conversational interface, and applications interact through the API 106, but this is not a requirement.

The graphical user interface 104 is the platform through which users interact with the generative response engine 110. It can be a web-based chat window, a mobile application, or any interface that supports data input and output. The graphical user interface 104 facilitates a conversation between the user and the generative response engine, as the user provides prompts in the graphical user interface 104 to which the generative response engine responds and presents those responses in the graphical user interface 104. In some aspects, graphical user interface 104 presents a conversational interface, which has attributes of a conversation thread between a user account and generative response engine 110.

The graphical user interface 104 is configured to perform input handling, context management, and output presentation. The type of inputs that can be received can be relative to the specifics of the generative response engine 110. For example, a language model is generally configured to accept text, but when the generative response engine is a multimodal generative response engine, the front end 102 can accept voice and images/video.

In some aspects, front end 102 can be an interface to accept any input types as part of the prompt, and downstream services can determine which generative response engine or collection of generative response engines are best suited to respond to the prompt.

The graphical user interface 104 is also configured to maintain the context of the conversation, which allows for coherent and relevant responses. For example, the graphical user interface 104 is responsible for providing the conversation thread and other relevant context accessible to the front end 102 to the generative response engine along with the specific prompt to the generative response engine. In an example, a conversation between the user account and the generative response engine 110 can have taken several turns (prompt, response, prompt, response, etc.). When the user account provides a further prompt, the graphical user interface 104 can provide that prompt to the generative response engine in the context of the entire conversation.

In another example, the graphical user interface 104 might be configured to provide a system prompt along with a user-provided prompt. A system prompt is hidden from the user account and is used to set the behavior and guidelines for the generative response engine. It can be used to define the AI's persona, style, and constraints. There can be levels of system prompts. A highest level of a system prompt might be provided by the generative response engine 110 provider and may be meant to establish policies for the behavior of generative response engine 110. This highest level of system prompt should be prohibited from being edited. A customization system prompt can be used to customize the behavior of the generative response engine and is often provided through an API call, or provided by a user account when creating a customized version of generative response engine 110. A still lower level of system prompt might include hidden information about a task. This can include chain-of-thought from a reasoning model, or context about an application the generative response engine 110 is working with to complete a task. Accordingly, the graphical user interface 104 does not always display all of the output of the generative response engine.

The graphical user interface 104 is also configured to display the responses from the generative response engine, which might include text, code snippets, images, or interactive elements.

In some aspects, the generative response engine 110 can provide instructions to the front end 102 that instruct the graphical user interface 104 about how to display some of the output from the generative response engine. For example, the generative response engine can direct the graphical user interface 104 to present code in a code-specific format, or to present interactive graphics, or static images. In other examples, the generative response engine can direct the graphical user interface 104 to present an interactive document editor where the graphical user interface 104 can be presented with the document editor so that the user account and the generative response engine can collaborate on the document.

In some aspects, the generative response engine 110 can provide instructions memory 126 to record facts in a personalization notepad, and front end 102 can be configured to notify the user account that a memory was created.

As noted above, the front end 102 can also provide one or more application programming interfaces (API(s)) 106. APIs enable developers to integrate the generative response engine's capabilities into external applications and services. They provide programmatic access to the generative response engine, allowing for customized interactions and functionalities. While APIs 106 are shown as part of a front end 102, this illustration takes the liberty of locating API 106 in front end 102 to refer to points of access to generative response engine 110 (i.e., graphical user interface 104 and APIs 106 are points of access and generative response engine 110 sends and receives messages to them in similar ways). In reality, API 106 endpoints are located at context management service 120.

The APIs 106 can accept structured requests containing prompts, context, and configuration parameters. For example, an API can be used to provide prompts and divide the prompt into system prompts and user prompts. In some aspects, the APIs 106 can provide specific inputs for which the generative response engine 110 is configured to respond with a specific behavior. For example, an API can be used to specify that it requires an output in a particular format or structured output. For example, in the chat completion API, the API call can specify parameters for the output, such as the max length for the desired output, and specify aspects of the tone of the language used in the response. Some common APIs are for participating in a conversation (Chat Completion API), for providing a single response (Completion API), for converting text into embeddings (Embeddings API), etc. The API can also be used to indicate specific decision boundaries that the generative response engine 110 might be trained to interpret. For example, the moderation API can take advantage of the AI assistant service 100's content moderation decision-making. In the case of the moderation API and others, the API might give access to services other than the generative response engine. For example, the moderation API might be an interface to moderation system 138, addressed below.

Some other common APIs include the Fine-Tuning API, which allows developers to customize models of the generative response engine using their own datasets; the Audio and Speech APIs, which cause the generative response engine to output speech or audio; and the Image Generation API, which causes the generative response engine to output images (which might require utilizing other models).

There can also be APIs that direct the generative response engine to interface with other applications or other generative AI engines. In such cases, the specific application or AI engine might be specified, or the generative response engine might be allowed to choose another application of AI engine to utilize in response to a prompt.

In short, the graphical user interface 104 and the APIs 106 can be used to provide prompts to the generative response engine. Prompts are sometimes differentiated into prompt types. For example, a system prompt can be a hidden prompt that sets the behavior and guidelines for the generative response engine. A user prompt is the explicit input provided by the user, which may include questions, commands, or information.

Sitting in between front end 102 and generative response engine 110 is a context management service 120. The function of context management service 120 is to manage and organize the flow of data among key subsystems, enabling the generative response engine 110 to generate responses that are contextually relevant, accurate, and enriched with additional information as required.

Action 122 facilitates auxiliary tasks that extend beyond basic text generation. In some aspects, action 122 can be actions that correspond to an API 106. In some aspects, action 122 can be agentic actions that the generative response engine 110 decides to take to carry out a user's intent as described in the prompt. For example, an action can be to call tool 130 or even another generative response engine 110.

Prompt 124 is the request or command provided by the user account through front end 102. In some aspects, prompt 124 can be further supplemented by a system prompt and other information that might be included by graphical user interface 104 or API 106 or associated with a custom generative response engine 110. In some aspects, prompt 124 can even be modified or enhanced by generative response engine 110 as addressed further below. Additionally, as the user account provides prompts and generative response engine 110 provides responses, a conversation thread forms. As the user account provides a new prompt, this is appended to the overall conversation and added to prompt 124. Thus, a user account might think of a first user-provided message as a first prompt and a second user-provided message as a second prompt, and so on, but prompt 124 as perceived by generative response engine 110 can include a thread of user-provided messages and responses from generative response engine 110 in a multi-turn conversation. The actors in the conversation thread can be labeled so that generative response engine 110 can review the turns of the conversation. Generally, prompt 124 will include an entire conversation thread, but in some instances, prompt 124 might need to be shortened if it exceeds a maximum accepted length (generally measured by a number of tokens).

Context management service 120 can also route prompts and response through moderation system 138. In some aspects, prompts are provided to prompt safety system 134 before being provided to generative response engine 110. Prompt safety system 134 is configured to use one or more techniques to evaluate prompts to ensure a prompt is not requesting generative response engine 110 to generate moderated content. In some aspects, prompt safety system 134 can utilize text pattern matching, classifiers, and/or other AI techniques.

Since prompts can evolve over time through the course of a conversation, consisting of prompts and responses, prompts can be repeatedly evaluated at each turn in the conversation.

Memory 126 can facilitate continuity and personalization in conversations. It allows the system to maintain user-specific context, preferences, or details that may inform future interactions. A memory file can be persisted data from previous interactions or sessions that provide background information to maintain continuity. In some aspects, memory can be recorded at the instruction of generative response engine 110 when generative response engine 110 identifies a fact or data that it determines should be saved in memory because it might be useful in later conversations or sessions. In some aspects, memory 126 can also include synthesized concepts extracted from past conversation threads, and memory 126 can also encompass the ability of generative response engine 110 to search through past interactions to find relevant information to a current conversation thread.

Conversation metadata 128 can aggregate data points relevant to the conversation, including user prompt 124, action 122, and memory 126. This consolidated information package serves as the input for generative response engine 110. Conversation metadata 128 can label parts of a prompt as user provided, generative response engine provided, a system prompt, memory 126, data from action 122 or tool 130 (addressed below).

The generative response engine is the core engine that processes inputs (from context management service 120) and generates outputs. In some aspects, the generative response engine is a generative transformer, or autoregressive transformer, but it could utilize other architectures. In some examples, the transformer is multi-modal transformer that can use audio tokens (or embeddings thereof), visual tokens (or embeddings thereof), and language (or embeddings thereof) as needed.

A core feature of the generative response engine 110 is to generate content in response to prompts. The generative response engine 110 is configured to receive inputs from front end 102 that provide guidance on a desired output. The generative response engine can analyze the input and identify relevant patterns and associations in the data, and it has learned to generate a sequence of tokens that are predicted as the most likely continuation of the input. The generative response engine 110 generates responses by sampling from the probability distribution of possible tokens, guided by the patterns observed during its training. Two features of the autoregressive transformer that result in this functionality are that the autoregressive transformer might use only the decoder part of the transformer architecture and that it utilizes self-attention. By utilizing the decoder part of the transformer architecture, the transformer focuses on predicting the tokens given the previous context tokens. And the self-attention mechanism captures long-range dependencies amongst tokens, allowing it to generate contextually relevant responses (in text, audio, images, and video).

In some aspects, the generative response engine 110 can generate multiple possible responses before presenting the final one. Generative response engine 110 can generate multiple responses based on the input, and these responses are variations that the generative response engine 110 considers potentially relevant and coherent.

In some aspects, the generative response engine 110 can evaluate generated responses based on certain criteria. These criteria can include relevance to the prompt, coherence, fluency, and sometimes adherence to specific guidelines or rules, depending on the application. Based on this evaluation, the generative response engine 110 can select the most appropriate response. This selection is typically the one that scores highest on the set criteria, balancing factors like relevance, informativeness, coherence, and content moderation instructions/training.

In some aspects, an instruction provided by an API 106, a system prompt, or a decision made by generative response engine 110 can cause the generative response engine 110 to interpret a prompt and re-write it or improve the prompt for a desired purpose. For example, generative response engine 110 can determine to take a prompt to make a picture and enhance the prompt to yield a better picture. In these instances, generative response engine 110 can generate its own prompts, which can be provided to a tool 130 or provided to generative response engine 110 to yield a better output response than the original prompt might have.

The generative response engine 110 can also do more than generate content in response to a prompt. In some aspects, the generative response engine 110 can utilize decision boundaries to determine the appropriate course of action based on the prompt. In some examples, a decision boundary might be used to cause the generative response engine to recognize that it is being asked to provide a response in a particular format such that it will generate its response constrained by the particular format. In some examples, a decision boundary can cause the model to refuse to generate a responsive output if the decision is that the responsive output would violate a moderation policy. In some examples, the decision boundary might cause the generative response engine to recognize that it needs to interface with another AI model or application to respond to the prompt. For example, when the generative response engine is a language model, it might recognize that it is being asked to output an image, and therefore, it needs to interface with a model that can output images to provide a response to the prompt. In another example, the prompt might request a search of the Internet before responding. The generative response engine can use a decision boundary to recognize that it should conduct a search of the Internet and use the results of that search in responding to the prompt. In another example, the prompt might request that the generative response engine take an agentic action on behalf of the user by interacting with a third-party service (e.g., book a reservation for me at . . . ), and the generative response engine can utilize a decision boundary to recognize that it needs to plan steps to locate the third-party service, contact the third-party service, and interact with the third-party service to complete the task and then report back to the user that the action has been completed.

When generative response engine 110 determines that it should take an agentic action on behalf of the user or it should call a tool to aid in providing a quality response to the user account, the generative response engine 110 might call a tool 130 or cause an action 122 to be performed. As indicated above, tools 130 can include internet browsers, editors such as code editors, other AI tools etc. Actions 122 are actions that the generative response engine 110 can cause to be performed, perhaps using tool 130. As used herein actions 122 should be considered to cover a broad array of actions that generative response engine 110 can perform with or without tools 130. Tools 130 are considered to cover a wide variety of services and software that encompass tools such as a computer operating system such that the generative response engine 110 can control the computer operating system on the user's behalf, to robotic actuators, to search browsers and specific applications.

Additionally, the generative response engine 110 can also generate portions of responses that are not displayed to the user. For example, the generative response engine 110 can direct the front end 102 to provide specific behaviors, such as directions for how to present the response from the generative response engine 110 to the user account. In another example, the generative response engine 110 can provide response portions dictated by an API, where portions of the response to the API might be for the consumption of the calling application but not for presentation to the end user. In another example, some generative response engine 110 are reasoning models, which are generative response engine 110 that are configured to output a raw chain-of-thought before preparing a final response to a prompt. The raw chain-of-thought might not be presented to a user account or application calling an API. Instead, another generative response engine 110 might summarize the raw chain-of-thought into a more consumable and useful output for the user account or application.

In some aspects, the output of generative response engine can be further analyzed by output safety system 136. While generative response engine 110 can perform some of its own moderation, there can be instances where it is desired to have another service review outputs for compliance with the moderation policy. The use of dashed lines in FIG. 1 differentiates a path using output safety system 136 and not using output safety system 136.

While FIG. 1 shows responses being provided back to front end 102 directly, in some aspects, the responses might be returned by way of context management service 120.

Figure 2:
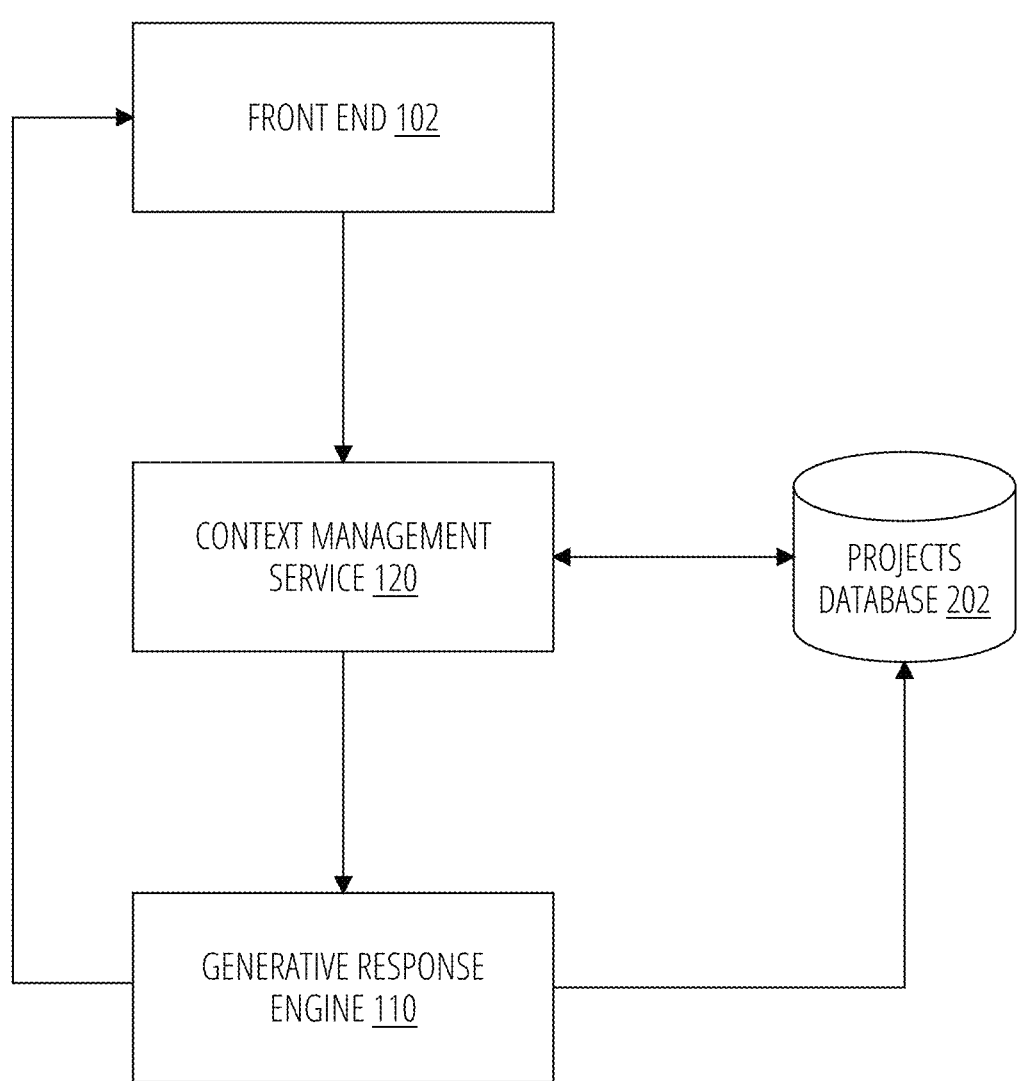
FIG. 2 illustrates an example system for generating output from a generative response engine given a context in accordance with some aspects of the present technology.

FIG. 2 illustrates an example system 200 for storing and using smart folders storing context items in accordance with some aspects of the present technology. Although the example system 200 depicts particular system components and an arrangement of such components, this depiction is to facilitate a discussion of the present technology and should not be considered limiting unless specified in the appended claims. For example, some components that are illustrated as separate can be combined with other components, and some components can be divided into separate components. In some examples, system 200 can be the same as, or similar to, AI assistant service 100.

System 200 may include a projects database 202 configured to store one or more smart folders. A smart folder can be a folder in projects database 202 storing one or more context items. A context item can be any item for providing context to generative response engine 110 via its context window. For example, a context item can be a set of one or more instructions for generating a custom model (e.g., a custom GPT), a document or other file (e.g., image file, video file, audio file, etc.), a code file, a collaborative document (e.g., a document generated and edited via CANVAS), a conversation thread, and the like. The smart folder can be owned by a user account (e.g., the user account that created the smart folder). In some examples, a smart folder may also include a folder personalization state storing memories inferred from or generated by user account interactions within the smart folder.

As an example, a user account can select a smart folder from a set of folders available to the user account, which can include folders owned by the user account and folders shared with the user account by other user accounts. Front end 102 can receive the selection of the smart folder and provide the selection of the smart folder or an identifier of the smart folder to context management service 120. Context management service 120 can retrieve the one or more context items from the smart folder in projects database 202, and provide the one or more context items to generative response engine 110 via its context window.

In some examples, context management service 120 may also provide, via the context window, a personalization state associated with the user account. The personalization state can be stored by memory 126 and may be based on information included in previous interactions between the user account and generative response engine 110.

Simultaneously or in tandem, front end 102 can receive a prompt from the user account and can provide the prompt, via context management service 120, to generative response engine 110. Generative response engine 110 can output tokens in response to the prompt and based on the one or more context items and/or personalization state provided via its context window. Accordingly, context items from the smart folders can be retrieved on demand and provided to generative response engine 110.

Accordingly, system 200 allows a user account to store and organize one or more smart folders, each containing one or more context items and/or one or more sub-folders. The one or more context items stored in a smart folder can be provided to generative response engine 110 as context for generating output in response to a prompt.

In some examples, system 200 can further include automatically updating one or more context items in a smart folder. For example, after selecting a smart folder, the user account can interact with generative response engine 110 such that the interaction is saved as a new conversation thread in the smart folder or the interaction is appended to a conversation thread already in the smart folder. In some examples, a component of system 200 (e.g., front end 102 or context management service 120) can automatically save a conversation thread to a smart folder based on a topic of the conversation thread or on content of the conversation thread. Accordingly, smart folders can automatically be updated with context items containing content related to the content stored in the smart folder.

Figure 3:
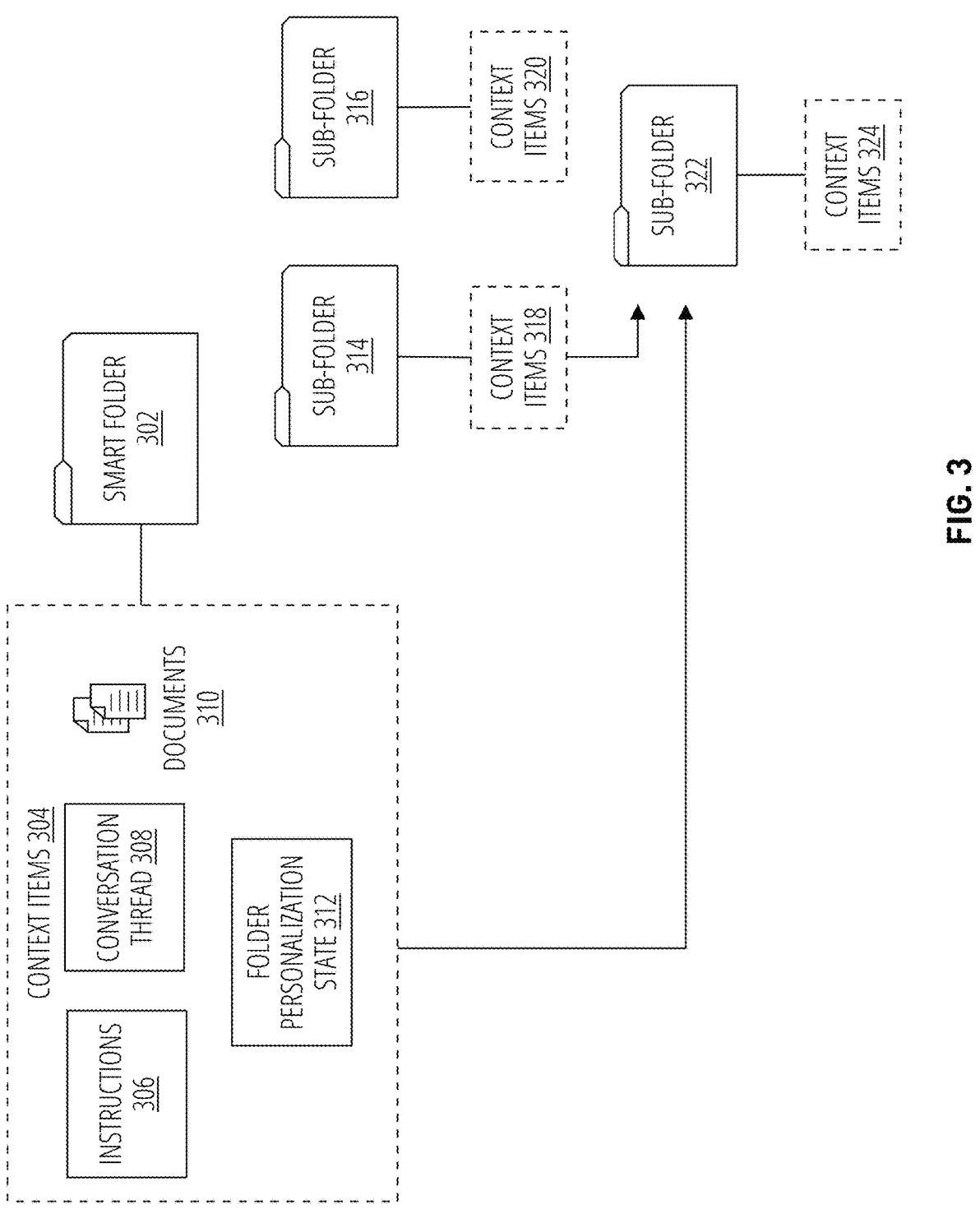
FIG. 3 illustrates an example file structure of smart folders in accordance with some aspects of the present technology.

FIG. 3 illustrates an exemplary file structure for storing smart folders in projects database 202 in accordance with some aspects of the present technology. The organizational structure of smart folders stored in projects database 202 can be used to impute a hierarchy with which to apply context items and/or instructions of the smart folders.

In this example, projects database 202 can store a smart folder 302. Smart folder 302 may store one or more context items 304, which can include, for example, documents 310, conversation thread 308, and instructions 306. Context items 304 can include additional items such as image files, code files, spreadsheets, link or pointers to additional data or an external database, and the like.

Instructions 306 can include any instructions provided by the user account to generative response engine 110 to influence the output generated by generative response engine 110. For example, instructions can include specifications of a type of output (e.g., text, code, audio output, etc.), a style of output (e.g., reading level, writing style, format, etc.), length of output, and/or any background information (e.g., personal preferences of the user account, parameters, etc.). In some examples, instructions 306 can be used to configure a custom model (e.g., custom GPT) and can be saved in smart folder 302 such that the user account can select smart folder 302 to access the custom model that already has context items 304 accessible to. In one example, instructions 306 can define a set of parameters for generative response engine 110. By selecting smart folder 302, the context window used by the custom model can be populated with the context items 304. This obviates the need for the user account to regenerate or re-input instructions 306 for each new conversation or interaction with generative response engine 110.

Conversation thread 308 can include a series of prompts and responses from the user account and generative response engine 110, respectively. Conversation thread 308 can be a separate conversation thread saved to smart folder 302, or can be created as the user account interacts with generative response engine 110, thereby building a conversation thread of prompts and responses stored within smart folder 302. Conversation thread 308 can provide additional context both through the literal content of conversation thread 308, and through information inferred from conversation thread 308. Inferred information can include preferences or requirements pertaining to the user account's desired output (e.g., styles, formats, parameters) from generative response engine 110.

Documents 310 may include any documents uploaded to smart folder 302 via front end 102. In some examples, documents 310 can include any documents containing information to be referenced by generative response engine 110 in generating output based on a prompt. For example, documents 310 may include templates (e.g., to be referenced for format and style) or any document containing contextual information that the user account wishes to provide to generative response engine 110. In some examples, documents 310 can include documents generated by generative response engine 110 in response to one or more prompts from the user account. For example, the user account can prompt generative response engine 110 to output a document to a collaborative surface (e.g., Canvas) such that the user account and generative response engine 110 can collaboratively edit the document. The user account can save one or more versions of the document to smart folder 302 as context items. In some examples, documents generated or worked on while the user account is working within smart folder 302 can be automatically saved to smart folder 302.

Smart folder 302 can further include one or more sub-folders (e.g., a sub-folder 312 and a sub-folder 314). Sub-folder 312 can include context items 316 and sub-folder 314 can include context items 318. If the user account selects sub-folder 312, context management service 120 can retrieve contents of sub-folder 312 (e.g., context items 316) as well as contents of its parent folder, smart folder 302, and provide these contents to generative response engine 110 in its context window. In some examples, additional context provided to generative response engine 110 can include information about the file structure of smart folder 302 and sub-folder 312, such that generative response engine 110 can impute a hierarchy of the content items stored in the folders. As an example, context items 316 may include more detailed instructions for configuring a custom model, intended to build upon or refine instructions 306. In some examples, conflicts may arise between context items 304 and context items 316. In these cases, generative response engine 110 can be trained to resolve conflicting rules. In some cases, conflicts may be resolved based on the hierarchy of context items determined based on the file structure.

While context items may be shared from smart folder 302 to sub-folder 312 and sub-folder 314, the context items in respective sub-folders may be separate. For example, sub-folder 312 may not access context items 318 of sub-folder 314, and sub-folder 314 may not access context items 316 of sub-folder 312. Further, if the user account selects smart folder 302, context items 304 may be provided to generative response engine 110, but not context items of sub-folder 312 and sub-folder 314. Each sub-folder can further include additional sub-folders (e.g., sub-folder 320 containing context items 322) and so on, where selecting sub-folder 320 provides generative response engine 110 with context items 322, context items 316 of sub-folder 312, and context items 304 of smart folder 302. As discussed above, instructions or context items of each folder can be applied in a layered approach based on the file structure of smart folder 302, sub-folder 312, and sub-folder 320.

In some examples, the user account that created smart folder 302, sub-folder 312, sub-folder 314, and sub-folder 320 may share one or more of these folders with other user accounts, such that the other user accounts may interact with generative response engine 110 given the context items of the shared folder or folders. For example, the user account may share sub-folder 314 with a second user account. Accordingly, the second user account may select sub-folder 314 via front end 102 such that the second user account can interact with generative response engine 110 given the context items of sub-folder 314 and smart folder 302 (e.g., context items 318 and context items 304, respectively).

Because sub-folder 314 is contained in smart folder 302, even though the second user account may not have access to smart folder 302, context items 304 may still be provided to generative response engine 110 based on sub-folder 314's dependence from smart folder 302. In one example, the second user account may be granted permission, by the user account owning smart folder 302 and sub-folder 314, to edit one or more context items of context items 318. In this example, the editing permissions may only extend to context items 318, such that the second user account cannot access or edit smart folder 302 or any other sub-folders (other than sub-folder 314) of the context items contained therein. Further, edits made to context items of any folders containing sub-folders may be imputed to any additional, downstream sub-folders.

Figure 4A:
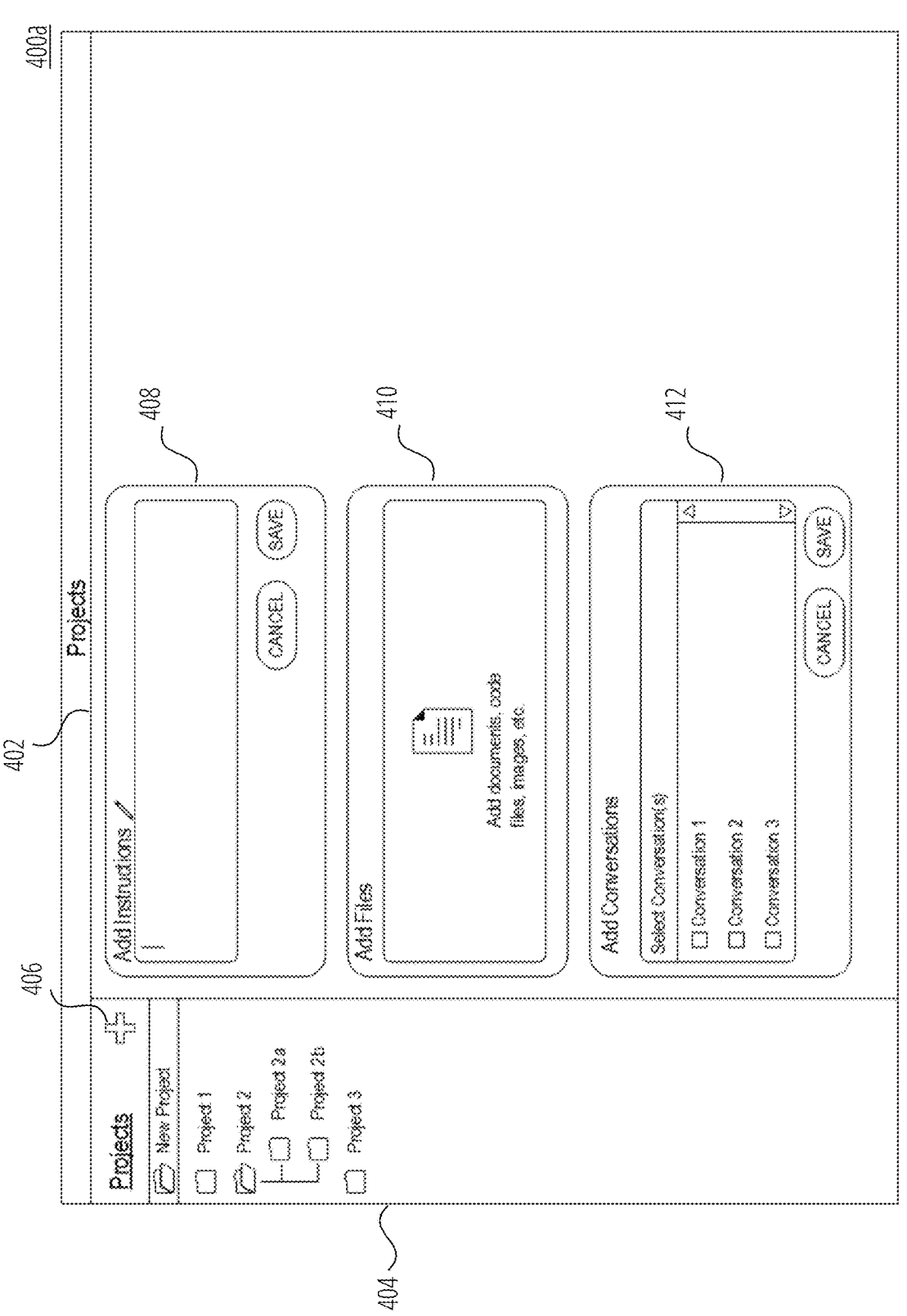
FIG. 4A and FIG. 4B illustrate examples interfaces for managing smart folders in accordance with some aspects of the present technology.

FIG. 4A illustrates an example interface 400a for creating a smart folder containing one or more context items in accordance with some aspects of the present technology. Interface 400a may be displayed to a user of a device via an interface of the device. In some examples, interface 400a can be provided by front end 102 as an application or via web browser of the client device.

Interface 400a can display a project dashboard 402 for viewing smart folders created by or shared with a user account. Project dashboard 402 can include a folder menu

404, displaying the smart folders owned by or shared with the user account. Project dashboard 402 can further include a button 406 for creating a new smart folder. Selecting button 406 can create a smart folder to be stored in projects database 202. Project dashboard 402 can enable the user to add one or more context items to the new smart folder. For example, the user may add instructions for generative response engine 110 (e.g., via an instruction widget 408) or upload files from which generative response engine 110 can derive context for responding to prompts.

Instruction widget 408 can enable a user to directly type instructions into a text box and save the instructions in the new smart folder. The instructions can set one or more parameters or requirements for the response output by generative response engine 110. Project dashboard 402 enables the user to save instructions to the folder such that selecting the smart folder provides the instructions to generative response engine 110 without the user having to reproduce the instructions each time the user interacts with generative response engine 110. In some examples, the user can link previously saved instructions to the new smart folder.

File widget 410 can enable the user to upload one or more files to the new smart folder. For example, the user can click and drag files to file widget 410 or can select files stored in the device memory to upload to the smart folder and be stored in the smart folder in projects database 202. Any files can be uploaded using file widget 410 including documents, spreadsheets, image files, audio files, video files, code files, etc. In some examples, the user account can be associated with one or more collaborative documents, which may also be added to the new smart folder. In some examples, a collaborative document may be associated with its own conversation thread and/or context, which will be added to the new smart folder with the collaborative document.

Conversation widget 412 can enable a user to add conversation threads associated with their user account to the new smart folder. For example, the user account may be associated with one or more conversation threads of the user account's previous interactions with generative response engine 110. The user can easily select from these conversation threads to add one or more conversation threads to the smart folder.

Context items uploaded via instruction widget 408, file widget 410, and conversation widget 412 can be stored in projects database 202. During a subsequent session with generative response engine 110, the user can select the saved smart folder such that the saved context items can be provided to generative response engine 110 via its context window. Accordingly, the smart folder enables the user to easily save context items such that, at a subsequent time, the context items can be provided to generative response engine 110 without the user having to re-input instructions or prompts, or upload relevant files.

Figure 4B:
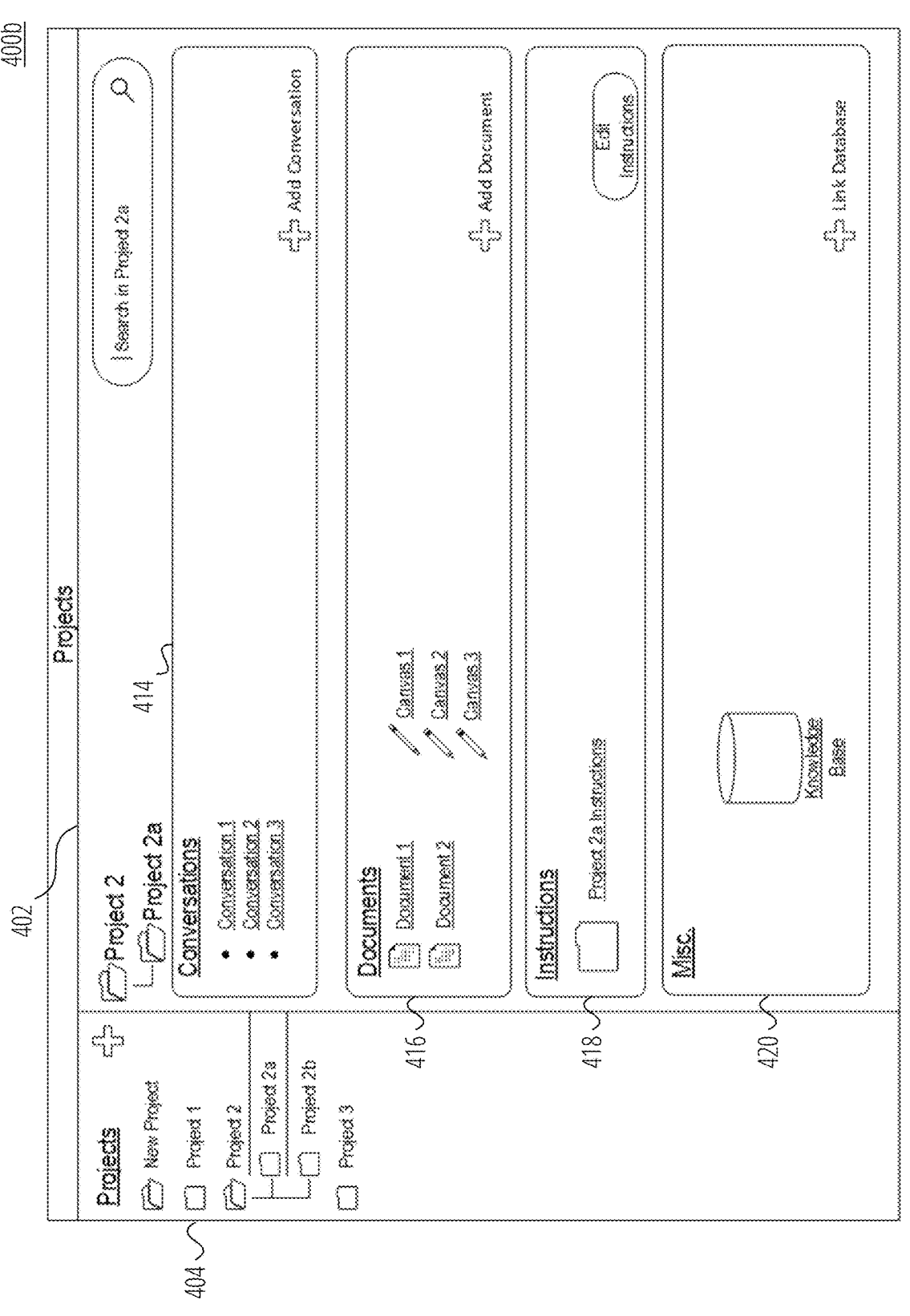

FIG. 4B illustrates an example interface 400b for accessing and managing one or more smart folders in accordance with some aspects of the present technology. Interface 400b may be displayed to a user of a device via an interface of the device. In some examples, interface 400b can be provided by front end 102 as an application or via web browser of the client device.

Interface 400b can facilitate management of smart folders stored in projects database 202 by the user. For example, a user can select a smart folder from folder menu 404 (e.g., "Project 2a"). Project dashboard 402 can display contents of the Project 2a folder such that the user can view, edit, add, and delete contents of the Project 2a folder.

Conversations 414 can include any conversation threads stored in the Project 2a folder. These can include previously generated conversation threads as well as a conversation thread continually generated as the user account interacts with generative response engine 110 while the Project 2a folder is loaded. In some examples, conversations stored in the Project 2 folder may also be provided to generative response engine 110 when interacting with generative response engine 110 within the Project 2a folder. Accordingly, context and information that can be derived from conversations in the Project 2 folder can be imputed to interactions within the Project 2a folder. In some examples, whether or not to provide conversation threads of the parent folder may be customizable by the user account owning the folder or folders.

Documents 416 can include any documents or files uploaded by the user account (e.g., via interface 400a). These documents can also include any documents generated by generative response engine 110. For documents generated by generative response engine 110, the Project 2a folder may also store the conversation thread associated with the generation of or any modifying of the document. When a user is interacting with generative response engine 110 within the Project 2a folder, generative response engine 110 may also be provided with documents separately stored in the Project 2 folder (e.g., the parent folder). This can enable, for example, a user account to upload and use consistent templates or materials across sub-folders without having to individually save each document in each sub-folder. As with conversation threads, whether documents of the Project 2 folder are also provided to generative response engine 110 when a user account is working within the Project 2a folder may be customizable by the user account or owner of the folders.

Instructions 418 can include instructions input via interface 400a when creating the Project 2a folder. In other examples, instructions can be uploaded as a code file or other file type. When working within the Project 2a folder, generative response engine 110 may receive instructions 418 as well as any instructions stored in the parent folder (e.g., the Project 2 folder). Based on the folder structure (e.g., the Project 2a folder being a sub-folder of the Project 2 folder), generative response engine 110 can impute a hierarchy for implementing both sets of instructions. In some examples, conflicts between instructions 418 and the instructions of the Project 2 folder can be handled by generative response engine 110, e.g., based on the hierarchy imputed from the folders. By imputing a hierarchy of instructions, a user account can create layered instructions by nesting folders within each other such that sub-folders can include unique instructions, but also inherit the instructions of the parent folder. Whether an individual folder inherits and/or shares its instructions can be customized by the user account owning the respective folder.

Miscellaneous 420 can include any additional input to be provided to the context window of generative response engine 110. In some examples, miscellaneous 420 may include linked databases (e.g., cloud databases) or other knowledge bases to be provided to generative response engine 110.

FIG. 5 illustrates an example method 500 for providing context to a generative response engine from a smart folder in accordance with some aspects of the present technology. Although example method 500 depicts a particular sequence of operations, the sequence may be altered without departing from the scope of the present disclosure. For example, some of the operations depicted may be performed in parallel or in a different sequence that does not materially affect the function of method 500. In other examples, different components of an example device or system that implements method 500 may perform functions at substantially the same time or in a specific sequence.

At block 502, method 500 can include receiving, by a front end to a generative response engine, a selection of a smart folder by a user account. For example, front end 102 can receive a selection of a smart folder via an interface provided by front end 102 via a device of the user account. Front end 102 can provide the selection of the smart folder (e.g., an indicator of the smart folder) to context management service 120, which retrieves contents of the smart folder from projects database 202 and provides it to the context window of generative response engine 110. In some examples, the smart folder groups at least two context items that are usable by the generative response engine in responding to prompts, where one of the at least two context items is a conversation thread between at least one user account and the generative response engine. In some examples, the at least two context items include a file (e.g., a document, code file, data file, etc.), model instructions, an additional conversation thread, and any other item for providing context to generative response engine 110. In some examples, the at least two context items may include at least two of: the conversation thread, a collaborative document, a knowledge base document, and an instruction to the generative response engine. In some examples, the at least two context items may include one or more collections of documents that can be searched using a file search tool. These collections can be indexed in a vector database for efficient searching. The generative response engine can use the file search tool to search the vector database for documents or parts of documents and load these documents of parts of documents into the context window to perform retrieval augmented generation (RAG) over the one or more documents or portions thereof.

In some examples, the generative response engine is a multi-modal transformer model. In some examples, the generative response engine is an autoregressive transformer model. In some examples, the generative response engine is configured to predict next tokens based on existing tokens. In some examples, the generative response engine has at least 1 billion parameters. In some examples, the generative response engine is a transformer-based language model adapted to accept text, audio, and vision inputs. In some examples, the generative response engine is a distilled version of a larger model having at least 1 billion parameters.

At block 504, method 500 can include receiving, by the front end, a prompt from the user account. For example, front end 102 may receive an audio, text, or other prompt input from a user account. Having selected the smart folder, the user account can be considered to be working "within" the smart folder such that prompts provided by the user account are responded to with the context of the contents of the smart folder.

At block 506, method 500 can include sending, by the front end, the prompt and the at least two context items to the generative response engine. For example, front end 102 can send the prompt and the at least two context items to generative response engine 110. As referenced above, in some examples, context management service 120 can retrieve contents of the smart folder from projects database 202 and provide the contents (e.g., the at least to context items) to generative response engine 110.

In some examples, the combined size of the at least two context items may exceed a size limit for the context window of generative response engine 110. In these examples, front end 102 may provide one or more of the at least two context items to generative response engine 110 with instructions to generative response engine 110 to output a summary of the one or more of the at least two context items (e.g., a summary that is smaller in size than the at least two context items and that is within the size limit of the context window of generative response engine 110). Thus, the summary or summaries can be provided to generative response engine 110 without exceeding the size limits of the context window. In other words, the generative response engine can search and summarize among its context items and context window to maintain the most relevant context in its limited context window for responding to a prompt.

In some examples, the smart folder may be nested within one or more parent smart folders, such that context items from the one or more parent smart folders are inherited by the smart folder and are provided to generative response engine 110 with the at least two context items of the smart folder. When there are nested context items due to the nesting of smart folders, the generative response engine can work in much the same way as in the single folder case, except that the generative response engine is trained to understand a hierarchy of instructions. More specifically, the generative response engine generally will treat all of the context items in the nested hierarchy as a source of context that can be added to the context window or summarized and added to the context window, just as in the single folder case. However, the generative response engine is trained to understand how to interpret layers of instructions such that top-level instructions are often more general and lower-level instructions are often more specific. The generative response engine was trained on examples where top-level instructions and lower-level instructions might conflict to learn how to resolve such conflicts. The generative response engine is also trained to understand when top-level instructions provide rules that must be followed or when the top-level instructions are merely general guidance.

In some examples, front end 102 or context management service 120 may retrieve and/or send a first user account personalization state to generative response engine 110 with the at least two context items. The first user account personalization state may be included in the context window of generative response engine 110 with the at least two context items. In some examples, the smart folder may be shared with a second user account, such that both the first user account and the second user account may interact with generative response engine 110 within the smart folder. In such an example, when the second user account interacts with generative response engine 110 within the smart folder, a second user account personalization state may be provided with the at least two context items in the context window of generative response engine 110. To maintain privacy of each user account, although the at least two context items of the smart folder can be accessed by both user accounts, and although the conversation thread of the smart folder is updated with prompts and responses to and from both user accounts, the personalization state of one user account cannot be accessed by the other user account via the smart folder.

When the smart folder is shared, normal content management permissions apply. Accordingly, if the smart folder includes a linked document, the content management system can only access the document if the user account has access to the linked document. In this way, content management rules are respected even though a smart folder might appear to give access to a content item. In short, if the content item is managed in another location, the source location controls access.

Another sharing paradigm is inheritance. Access can be inherited by sub-folders, but a user who has a sub-folder shared with them won't necessarily have access to higher-level folders without explicit permission.

A respective user account among user accounts that have access to the same smart folder 302 interacts with the generative response engine (or an instance thereof) that accesses a context window that is specific to the user account sending the prompt. In other words, while multiple user accounts share the context items in common and can see changes to the context items, a respective user account loads relevant portions of the context items and relevant portions of their personalization state into a context window that is specific to the respective user account. The result of this independent context window is that the generative response engine can generate responses that are appropriate for the respective user account that made the prompt. The response from the generative response engine can update a conversation thread such that all user accounts that have access to the smart folder can see the updates to the conversation thread. This also means that a second respective user might get a different response from the generative response engine because the second user will have their own context window that includes their own personalization.

In a concrete example, a product lawyer and an engineer could both have access to a smart folder 302 regarding a new product. If the product lawyer were to ask about the progress of the project, the generative response engine might reply, "The project is on pace for a June release. A beta version is being safety tested now." If the engineer were to ask the same question, the generative response engine might reply, "The product is on track for a June release. Here is a list of features that need to be completed . . . , and here is a list of bugs that need to be addressed. Your next task is . . . " The difference in the answer is caused by the different user account's personalization state.

At block 508, method 500 can include receiving, by the front end, a response output by the generative response engine based on the prompt and the at least two context items. For example, front end 102 can receive a response from generative response engine 110 where generative response engine 110 outputs the response based at least in part on the at least two context items.

At block 510, method 500 can include outputting, by the front end, the response to the user account and appending it to the conversation thread. For example, front end 102 can output the response to the user account (e.g., via an interface or as audio output). Front end 102 can also update a conversation thread of the at least two context items with the prompt and response, such that the prompt and response are provided to the context window of generative response engine 110 as part of the conversation thread during subsequent interactions between the user account and generative response engine 110. Accordingly, as the user account interacts with generative response engine 110 within the smart folder, the conversation thread stored by the smart folder is continually updated.

Thus, method 500 can be used to facilitate consistent application of layered instructions and other context items to generative response engine 110 by one or more user accounts. The smart folders described herein enable user accounts to organize and share instructions and context items such that a particular state of generative response engine 110 can be "saved" and returned to using the smart folder. Further, front end 102, context management service 120, or generative response engine 110 can dynamically manage the combined size of the context items such that context window size limits are not exceeded, thereby avoiding errors and obviating the need for a user account to manage the size of context items or prioritize which context items to include in the context window.

Figure 6:
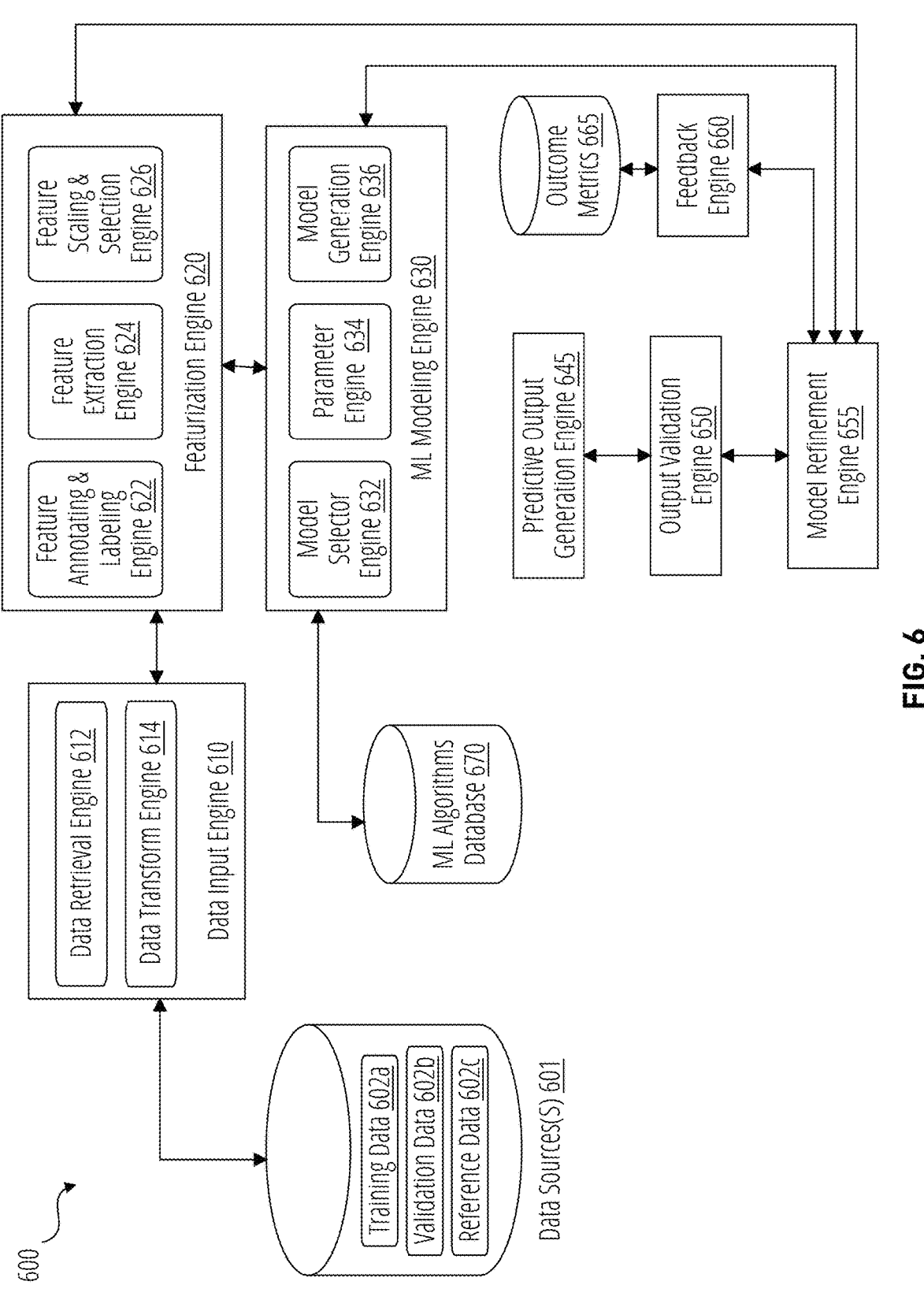
FIG. 6 is a block diagram illustrating an example machine-learning platform for implementing various aspects of this disclosure in accordance with some aspects of the present technology.

FIG. 6 is a block diagram illustrating an example machine learning platform for implementing various aspects of this disclosure in accordance with some aspects of the present technology. Although the example system depicts particular system components and an arrangement of such components, this depiction is to facilitate a discussion of the present technology and should not be considered limiting unless specified in the appended claims. For example, some components that are illustrated as separate can be combined with other components, and some components can be divided into separate components.

System 600 may include data input engine 610 that can further include data retrieval engine 612 and data transform engine 614. Data retrieval engine 612 may be configured to access, interpret, request, or receive data, which may be adjusted, reformatted, or changed (e.g., to be interpretable by another engine, such as data input engine 610). For example, data retrieval engine 612 may request data from a remote source using an API. Data input engine 610 may be configured to access, interpret, request, format, re-format, or receive input data from data sources(s) 601. For example, data input engine 610 may be configured to use data transform engine 614 to execute a re-configuration or other change to data, such as a data dimension reduction. In some aspects, data sources(s) 601 may be associated with a single entity (e.g., organization) or with multiple entities. Data sources(s) 601 may include one or more of training data 602*a* (e.g., input data to feed a machine learning model as part of one or more training processes), validation data 602*b* (e.g., data against which at least one processor may compare model output with, such as to determine model output quality), and/or reference data 602*c*. In some aspects, data input engine 610 can be implemented using at least one computing device. For example, data from data sources(s) 601 can be obtained through one or more I/O devices and/or network interfaces. Further, the data may be stored (e.g., during execution of one or more operations) in a suitable storage or system memory. Data input engine 610 may also be configured to interact with a data storage, which may be implemented on a computing device that stores data in storage or system memory.

System 600 may include featurization engine 620. Featurization engine 620 may include feature annotating & labeling engine 622 (e.g., configured to annotate or label features from a model or data, which may be extracted by feature extraction engine 624), feature extraction engine 624 (e.g., configured to extract one or more features from a model or data, and/or feature scaling & selection engine 626 Feature scaling & selection engine 626 may be configured to determine, select, limit, constrain, concatenate, or define features (e.g., AI features) for use with AI models.

System 600 may also include machine learning (ML) ML modeling engine 630, which may be configured to execute one or more operations on a machine learning model (e.g., model training, model re-configuration, model validation, model testing), such as those described in the processes described herein. For example, ML modeling engine 630 may execute an operation to train a machine learning model, such as adding, removing, or modifying a model parameter.

Training of a machine learning model may be supervised, semi-supervised, or unsupervised. In some aspects, training of a machine learning model may include multiple epochs, or passes of data (e.g., training data 602*a*) through a machine learning model process (e.g., a training process). In some aspects, different epochs may have different degrees of supervision (e.g., supervised, semi-supervised, or unsupervised). Data into a model to train the model may include input data (e.g., as described above) and/or data previously output from a model (e.g., forming a recursive learning feedback). A model parameter may include one or more of a seed value, a model node, a model layer, an algorithm, a function, a model connection (e.g., between other model parameters or between models), a model constraint, or any other digital component influencing the output of a model. A model connection may include or represent a relationship between model parameters and/or models, which may be dependent or interdependent, hierarchical, and/or static or dynamic. The combination and configuration of the model parameters and relationships between model parameters discussed herein are cognitively infeasible for the human mind to maintain or use. Without limiting the disclosed aspects in any way, a machine learning model may include millions, billions, or even trillions of model parameters. ML modeling engine 630 may include model selector engine 632 (e.g., configured to select a model from among a plurality of models, such as based on input data), parameter engine 634 (e.g., configured to add, remove, and/or change one or more parameters of a model), and/or model generation engine 636 (e.g., configured to generate one or more machine learning models, such as according to model input data, model output data, comparison data, and/or validation data).

In some aspects, model selector engine 632 may be configured to receive input and/or transmit output to ML algorithms database 670. Similarly, featurization engine 620 can utilize storage or system memory for storing data and can utilize one or more I/O devices or network interfaces for transmitting or receiving data. M L algorithms database 670 may store one or more machine learning models, any of which may be fully trained, partially trained, or untrained. A machine learning model may be or include, without limitation, one or more of (e.g., such as in the case of a meta-model) a statistical model, an algorithm, a neural network (NN), a convolutional neural network (CNN), a generative neural network (GNN), a Word2Vec model, a bag of words model, a term frequency-inverse document frequency (tf-idf) model, a GPT (Generative Pre-trained Transformer) model (or other autoregressive model), a diffusion model, a diffusion-transformer model, an encoder such as BERT (Bidirectional Encoder Representations from Transformers) or LXMERT (Learning Cross-Modality Encoder Representations from Transformers), a Proximal Policy Optimization (PPO) model, a nearest neighbor model (e.g., k nearest neighbor model), a linear regression model, a k-means clustering model, a Q-Learning model, a Temporal Difference (TD) model, a Deep Adversarial Network model, or any other type of model described further herein. Some of the ML algorithms in ML algorithms database 670 can be considered generative response engines. Generative response engines are those models are commonly referred to as Generative AI, and that can receive an input prompt and generate additional content based on the prompt. GPTs, diffusion models, and diffusion-transformer models are some non-limiting examples of generative response engines. Some specific examples of generative response engines that can be stored in the ML algorithms database 670 include versions DALL•E, CHAT GPT, and SORA, all provided by OPEN AI.

System 600 can further include predictive output generation engine 645 and output validation engine 650 (e.g., configured to apply validation data to machine learning model output). Predictive output generation engine 645 can analyze the input and identify relevant patterns and associations in the data it has learned to generate a sequence of words that predictive output generation engine 645 predicts is the most likely continuation of the input using one or more models from the ML algorithms database 670, aiming to provide a coherent and contextually relevant answer. Predictive output generation engine 645 generates responses by sampling from the probability distribution of possible words and sequences, guided by the patterns observed during its training. In some aspects, predictive output generation engine 645 can generate multiple possible responses before presenting the final one. Predictive output generation engine 645 can generate multiple responses based on the input, and these responses are variations that predictive output generation engine 645 considers potentially relevant and coherent. Output validation engine 650 can evaluate these generated responses based on certain criteria. These criteria can include relevance to the prompt, coherence, fluency, and sometimes adherence to specific guidelines or rules, depending on the application. Based on this evaluation, output validation engine 650 selects the most appropriate response. This selection is typically the one that scores highest on the set criteria, balancing factors like relevance, informativeness, and coherence.

System 600 can further include feedback engine 660 (e.g., configured to apply feedback from a user and/or machine to a model) and model refinement engine 655 (e.g., configured to update or re-configure a model). In some aspects, feedback engine 660 may receive input and/or transmit output (e.g., output from a trained, partially trained, or untrained model) to outcome metrics database 665. Outcome metrics database 665 may be configured to store output from one or more models and may also be configured to associate output with one or more models. In some aspects, outcome metrics database 665, or other device (e.g., model refinement engine 655 or feedback engine 660), may be configured to correlate output, detect trends in output data, and/or infer a change to input or model parameters to cause a particular model output or type of model output. In some aspects, model refinement engine 655 may receive output from predictive output generation engine 645 or output validation engine 650. In some aspects, model refinement engine 655 may transmit the received output to featurization engine 620 or M L modeling engine 630 in one or more iterative cycles.

The engines of system 600 may be packaged functional hardware units designed for use with other components or a part of a program that performs a particular function (e.g., of related functions). Any or each of these modules may be implemented using a computing device. In some aspects, the functionality of system 600 may be split across multiple computing devices to allow for distributed processing of the data, which may improve output speed and reduce computational load on individual devices. In some aspects, system 600 may use load-balancing to maintain stable resource load (e.g., processing load, memory load, or bandwidth load) across multiple computing devices and to reduce the risk of a computing device or connection becoming overloaded. In these or other aspects, the different components may communicate over one or more I/O devices and/or network interfaces.

System 600 can be related to different domains or fields of use. Descriptions of aspects related to specific domains, such as natural language processing or language modeling, is not intended to limit the disclosed aspects to those specific domains, and aspects consistent with the present disclosure can apply to any domain that utilizes predictive modeling based on available data.

Figure 7A:
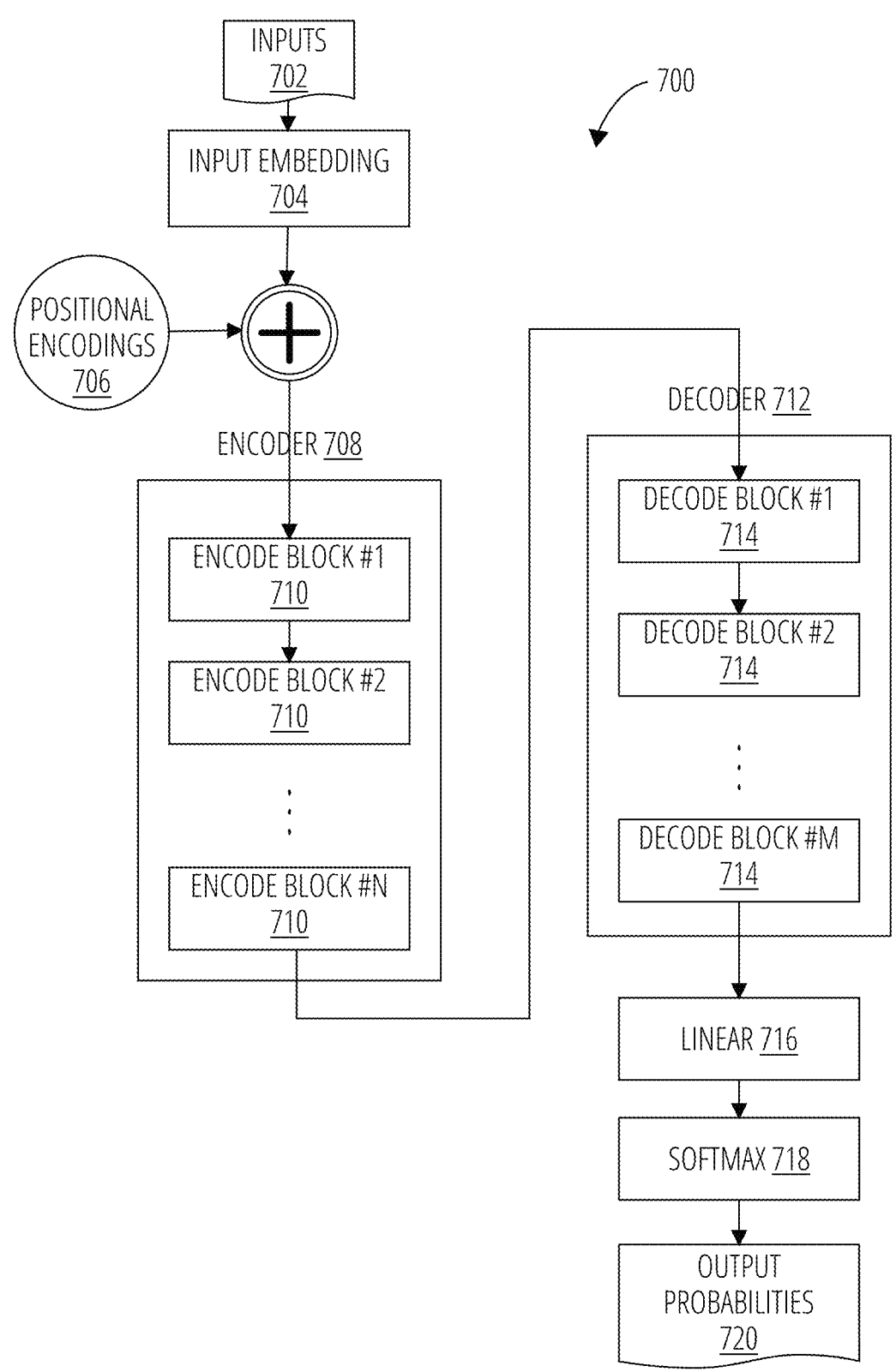
FIG. 7A, FIG. 7B, and FIG. 7C illustrate an example transformer architecture in accordance with some aspects of the present technology.
Figure 7B:
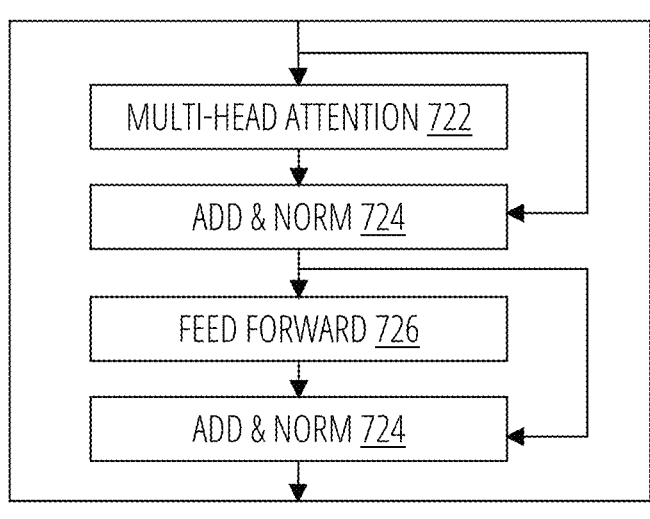
Figure 7C:
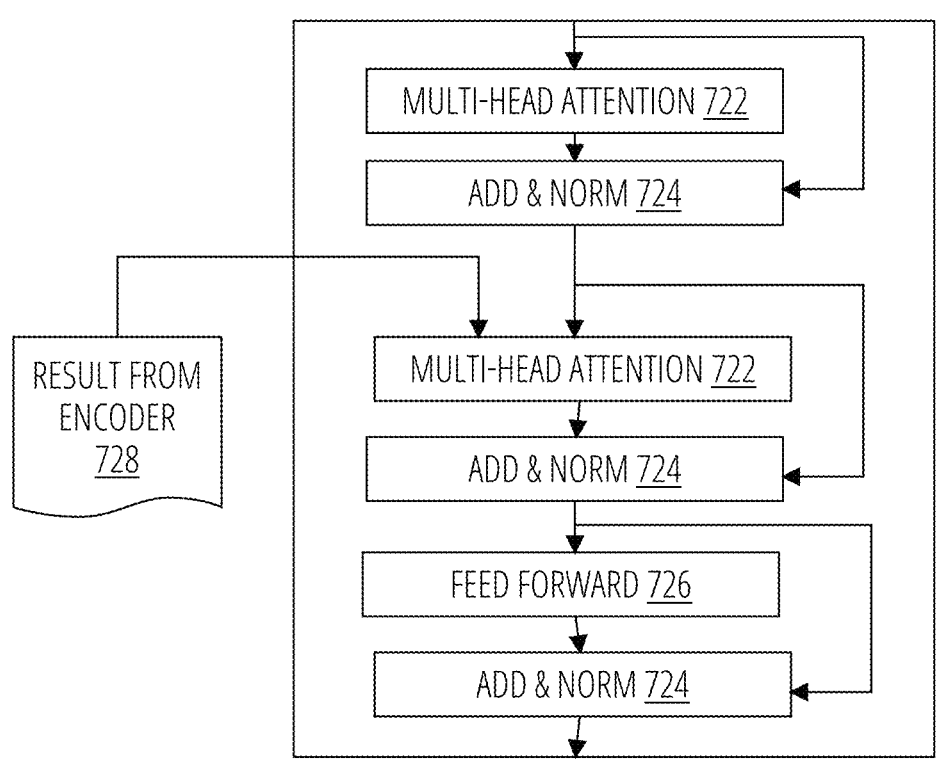

FIG. 7A, FIG. 7B, and FIG. 7C illustrates an example transformer architecture in accordance with some aspects of the present technology. Examples of ML models that use a transformer neural network (e.g., transformer architecture 700) can include, e.g., generative pretrained transformer (GPT) models and Bidirectional Encoder Representations from Transformer (BERT) models. The transformer architecture 700, which is illustrated in FIG. 7A, FIG. 7B, and FIG. 7C, includes inputs 702, input embedding block 704, positional encodings 706, encoder 708 including encode blocks 710, decoder 712 including decode blocks 714, linear block 716, softmax block 718, and output probabilities 720.

Input embedding block 704 is used to provide representations for words. For example, embedding can be used in text analysis. According to certain non-limiting examples, the representation is a real-valued vector that encodes the meaning of the word in such a way that words that are closer in the vector space are expected to be similar in meaning. Word embeddings can be obtained using language modeling and feature learning techniques, where words or phrases from the vocabulary are mapped to vectors of real numbers. According to certain non-limiting examples, the input embedding block 704 can be learned embeddings to convert the input tokens and output tokens to vectors of dimension that have the same dimension as the positional encodings, for example.

Positional encodings 706 provide information about the relative or absolute position of the tokens in the sequence. According to certain non-limiting examples, positional encodings 706 can be provided by adding positional encodings to the input embeddings at the inputs to the encoder 708 and decoder 712. The positional encodings have the same dimension as the embeddings, thereby enabling a summing of the embeddings with the positional encodings. There are several ways to realize the positional encodings, including learned and fixed. For example, sine and cosine functions having different frequencies can be used. That is, each dimension of the positional encoding corresponds to a sinusoid. Other techniques of conveying positional information can also be used, as would be understood by a person of ordinary skill in the art. For example, learned positional embeddings can instead be used to obtain similar results. An advantage of using sinusoidal positional encodings rather than learned positional encodings is that doing so allows the model to extrapolate to sequence lengths longer than the ones encountered during training.

Encoder 708 can use stacked self-attention and point-wise, fully connected layers. Encoder 708 can be a stack of N identical layers (e.g., N=6), and each layer can be an encode block, as illustrated by encode block 710 shown in FIG. 7B. Each encode block 710 has two sub-layers: (i) a first sub-layer has a multi-head attention block 722 and (ii) a second sub-layer has a feed forward block 726, which can be a position-wise fully connected feed-forward network. The feed forward block 726 can use a rectified linear unit (ReLU).

Encoder 708 uses a residual connection around each of the two sub-layers, followed by an add & norm block 724, which performs normalization. For example, the output of each sub-layer can be LayerNorm (x+Sublayer(x)). To facilitate these residual connections, all sub-layers in the model, as well as the embedding layers, produce output data having a same dimension.

Similar to encoder 708, decoder 712 uses stacked self-attention and point-wise, fully connected layers. Decoder 712 can also be a stack of M identical layers (e.g., M=6), and each layer can be a decode block, as illustrated by decode block 712 shown in FIG. 7B. In addition to the two sub-layers (i.e., the sublayer with multi-head attention block 722 and the sub-layer with feed forward block 726) found in encode block 710, decode block 714 can include a third sub-layer, which performs multi-head attention over the output of the encoder stack. Similar to encoder 708, decoder 712 uses residual connections around each of the sub-layers, followed by layer normalization. Additionally, the sub-layer with multi-head attention block 722 can be modified in the decoder stack to prevent positions from attending to subsequent positions. This masking, combined with the fact that the output embeddings are offset by one position, can ensure that the predictions for position i can depend only on the known output data at positions less than i.

Linear block 716 can be a learned linear transformation. For example, when transformer architecture 700 is being used to translate from a first language into a second language, linear block 716 can project the output from the last decode softmax block 718 into word scores for the second language (e.g., a score value for each unique word in the target vocabulary) at each position in the sentence. For instance, if the output sentence has seven words and the provided vocabulary for the second language has 10,000 unique words, then 10,000 score values are generated for each of those seven words. The score values indicate the likelihood of occurrence for each word in the vocabulary in that position of the sentence.

Softmax block 718 then turns the scores from linear block 716 into output probabilities 720 (which add up to 1.0). In each position, the index provides for the word with the highest probability, and then maps that index to the corresponding word in the vocabulary. Those words then form the output sequence of transformer architecture 700. The softmax operation is applied to the output from linear block 716 to convert the raw numbers into output probabilities 720 (e.g., token probabilities).

Figure 8:
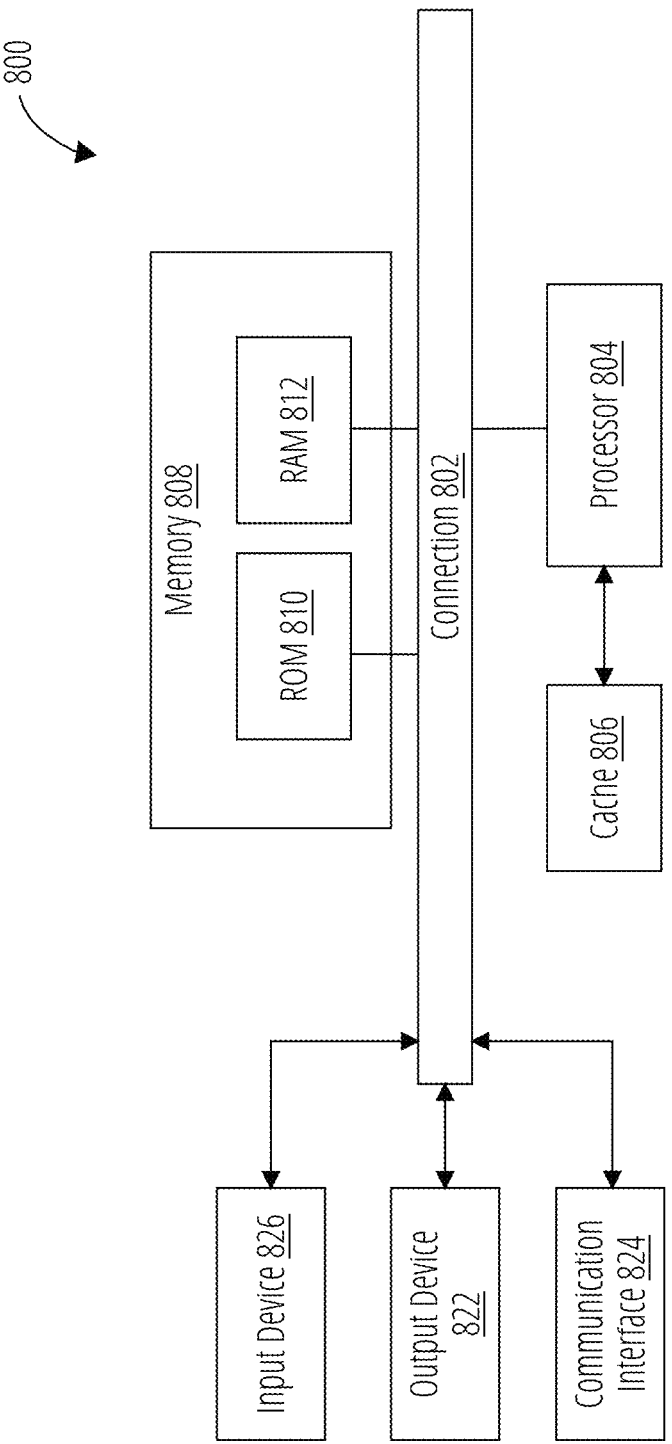
FIG. 8 shows an example of a system for implementing some aspects of the present technology.

FIG. 8 shows an example of computing system 800, which can be, for example, any computing device making up any engine illustrated in FIG. 1 or any component thereof.

In some aspects, computing system 800 is a single device, or a distributed system in which the functions described in this disclosure can be distributed within a datacenter, multiple data centers, a peer network, etc. In some aspects, one or more of the described system components represents many such components each performing some or all of the function for which the component is described. In some aspects, the components can be physical or virtual devices.

In some aspects, computing system 800 may comprise one or more computing resources provisioned from a "cloud computing" provider, For example, AMAZON ELASTIC COMPUTE CLOUD ("AMAZON EC2"), provided by AMAZON, INC. of Seattle, Washington; SUN CLOUD COMPUTER UTILITY, provided by SUN MICROSYSTEMS, INC. of Santa Clara, California; AZURE, provided by MICROSOFT CORPORATION of Redmond, Washington, GOOGLE CLOUD PLATFORM, provided by ALPHABET, INC. of Mountain View, California, and the like.

Example computing system 800 includes at least one processing unit (CPU or processor) 804 and connection 802 that couples various system components including system memory 808, such as read-only memory (ROM) 810 and random access memory (RAM) 812 to processor 804. Memory 808 can be a volatile or non-volatile memory device, and can be a hard disk or other types of non-transitory computer readable media which can store data that are accessible by a computer, such as magnetic cassettes, flash memory cards, solid state memory devices, digital versatile disks, cartridges, random access memories (RAM s), read-only memory (ROM), and/or some combination of these devices.

Memory 808 can include software services, servers, logic, etc., that when the code that defines such software is executed by the processor 804, it causes the system to perform a function. In some aspects, a hardware service that performs a particular function can include the software component stored in a computer-readable medium in connection with the necessary hardware components, such as processor 804, connection 802, output device 822, etc., to carry out the function.

Computing system 800 can include a cache of high-speed memory 806 connected directly with, in close proximity to, or integrated as part of processor 804.

Connection 802 can be a physical connection via a bus, or a direct connection into processor 804, such as in a chipset architecture. Connection 802 can also be a virtual connection, networked connection, or logical connection.

Processor 804 can include any general purpose processor and a hardware service or software service stored in memory 808, configured to control processor 804 as well as a special-purpose processor where software instructions are incorporated into the actual processor design. Processor 804 may essentially be a completely self-contained computing system, containing multiple cores or processors, a bus, memory controller, cache, etc. A multi-core processor may be symmetric or asymmetric. Processor 804 can be physical or virtual.

To enable user interaction, computing system 800 includes an input device 826, which can represent any number of input mechanisms, such as a microphone for speech, a touch-sensitive screen for gesture or graphical input, keyboard, mouse, motion input, speech, etc. Computing system 800 can also include output device 822, which can be one or more of a number of output mechanisms known to those of skill in the art. In some instances, multimodal systems can enable a user to provide multiple types of input/output to communicate with computing system 800. Computing system 800 can include communication interface 824, which can generally govern and manage the user input and system output. There is no restriction on operating on any particular hardware arrangement, and therefore the basic features here may easily be substituted for improved hardware or firmware arrangements as they are developed.

In some aspects, computing system 800 can refer to a combination of a personal computing device interacting with components hosted in a data center, where both the computing device and the components in the data center. In such examples, both the personal computing device and the components in the datacenter might have a processor, cache, memory, storage, etc.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some aspects, a service can be software that resides in memory of a client device and/or one or more servers of a content management system and perform one or more functions when a processor executes the software associated with the service. In some aspects, a service is a program or a collection of programs that carry out a specific function. In some aspects, a service can be considered a server. The memory can be a non-transitory computer-readable medium.

In some aspects, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, For example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Aspects:

Aspect 1: A method comprising: receiving, by a front end to a generative response engine, a selection of a smart folder by a user account, wherein the smart folder groups at least two context items that are usable by the generative response engine in responding to prompts, wherein one of the at least two context items is a conversation thread between at least one user account and the generative response engine, wherein the generative response engine is a multi-modal transformer model, wherein the generative response engine is an autoregressive transformer model, wherein the generative response engine is configure to predict next tokens based on existing tokens, wherein the generative response engine has at least 1 billion parameters, wherein the generative response engine is a transformer-based language model adapted to accept text, audio, and vision inputs, wherein the generative response engine is a distilled version of a larger model having at least 1 billion parameters;

receiving, by the front end, a prompt from the user account; sending, by the front end, the prompt and the at least two context items to the generative response engine; receiving, by the front end, a response output by the generative response engine based on the prompt and the at least two context items; and outputting, by the front end, the response to the user account and appending it to the conversation thread.

Aspect 2: The method of Aspect 1, wherein the at least two context items comprises at least two of: the conversation thread, a collaborative document, a knowledge base document, and an instruction to the generative response engine.

Aspect 3: The method of any of Aspects 1-2, further comprising: sending a first user account personalization state to the generative response engine with the at least two context items, wherein the first user account personalization state is included in a context window of the generative response engine with the at least two context items.

Aspect 4: The method of any of Aspects 1-3, further comprising: providing access privileges to the smart folder to a first user account and a second user account.

Aspect 5: The method of any of Aspects 1-4, further comprising: receiving, by the front end, a selection of the smart folder from the second user account; receiving, by the front end, the prompt from the second user account; sending, by the front end, the prompt to the generative response engine along with the at least two context items and a second user account personalization state; and receiving, by the front end, a second response output by the generative response engine based on the prompt and the at least two context items and the second user account personalization state, wherein the second response is personalized to the second user account; and appending the second response to the conversation thread.

Aspect 6: The method of any of Aspects 1-5, wherein when sending the prompt from the second user account, the front end does not send the first user account personalization state.

Aspect 7: The method of any of Aspects 1-6, wherein the smart folder is one of a set of smart folders organized in a nested hierarchy.

Aspect 8: The method of any of Aspects 1-7, wherein the at least two context items comprises at least one instruction inherited from a parent folder of the smart folder and wherein the at least one instruction informs the generative response engine how to response to the prompt.

Aspect 9: The method of any of Aspects 1-8, wherein the smart folder includes at least one sub-folder, wherein the at least one sub-folder inherits the at least one instruction from the parent folder of the smart folder and at least one instruction of the smart folder.

Aspect 10: The method of any of Aspects 1-9, wherein a respective sub-folder of the at least one sub-folder comprises a unique instruction.

Aspect 11: The method of any of Aspects 1-10, further comprising: providing, by the front end to the generative response engine, the at least one instruction from the parent folder and the at least one instruction from the smart folder, wherein a hierarchy of the at least one instruction from the parent folder and the at least one instruction from the smart folder is imputed from nesting of the smart folder in the parent folder.

Aspect 12: The method of any of Aspects 1-11, further comprising: storing, by the front end in the smart folder, a conversation thread comprising the prompt and the response.

Aspect 13: The method of any of Aspects 1-12, wherein the at least two context items comprises one or more documents stored as vectors in the smart folder.

Aspect 14: The method of any of Aspects 1-13, wherein the response from the generative response engine is aided using retrieval-augmented generation (RAG) over the one or more documents.

Aspect 15: The method of any of Aspects 1-14, wherein the at least two context items comprises one or more collaborative documents editable by a set of user accounts in a collaborative surface of the front end.

Aspect 16: The method of any of Aspects 1-15, further comprising: determining, by the front end, that the at least two context items exceed a storage limit associated with the folder; providing, by the front end to the generative response engine, the at least two context items and a prompt to generate a summary of the at least two context items; receiving, by the front end from the generative response engine, the summary; and storing, by the front end, the summary in the smart folder.

Aspect 17: A non-transitory computer-readable medium having stored thereon instructions that, when executed by at least one processor, cause the at least one processor to perform operations according to any of Aspects 1 to 16.

Aspect 18: A computing system for performing a function, comprising one or more means for performing operations according to any of Aspects 1 to 16.

The present technology includes computer-readable storage mediums for storing instructions, and systems for executing any one of the methods embodied in the instructions addressed in the aspects of the present technology presented below:

What is claimed is:

1. A method comprising:
  receiving, by a front end to a generative response engine, a selection of a smart folder by a first user account, wherein the smart folder groups at least two context items that are usable by the generative response engine in responding to prompts, wherein one of the at least two context items is a conversation thread between at least one user account and the generative response engine, and wherein the smart folder is associated with access privileges that grant access to the smart folder to the first user account and a second user account;
  receiving, by the front end, a prompt from the first user account;
  sending, by the front end, the prompt from the first user account and the at least two context items to the generative response engine;
  receiving, by the front end, a first response output by the generative response engine based on the prompt from the first user account and the at least two context items;
  outputting, by the front end, the response to the first user account and appending the first response to the conversation thread stored in the smart folder;
  receiving, by the front end, a prompt from the second user account and a selection of the smart folder;
  sending, by the front end, the prompt from the second user account to the generative response engine with the at least two context items and a personalization state of the second user account; and
  receiving, by the front end, a second response output by the generative response engine based on the prompt from the second user account and the at least two context items, wherein the second response is personalized to the second user account based on the personalization state of the second user account.

2. The method of claim 1, wherein the at least two context items comprises at least two of: the conversation thread, a collaborative document, a knowledge base document, and an instruction to the generative response engine.

3. The method of claim 2, further comprising:

sending a first user account personalization state to the generative response engine with the at least two context items, wherein the first user account personalization state is included in a context window of the generative response engine with the at least two context items.

4. The method of claim 1, further comprising:

appending the second response to the conversation thread.

5. The method of claim 4, wherein when sending the prompt from the second user account, the front end does not send the first user account personalization state.

6. A computing system comprising:

at least one processor; and a memory storing instructions that, when executed by the at least one processor, configure the computing system to:

receive a selection of a smart folder by a first user account, wherein the smart folder groups at least two context items that are usable by a generative response engine in responding to prompts, wherein one of the at least two context items is a conversation thread between at least one user account and the generative response engine, and wherein the smart folder is associated with access privileges that grant access to the smart folder to the first user account and a second user account;

receive a prompt from the first user account;

send the prompt from the first user account and the at least two context items to the generative response engine;

receive a first response output by the generative response engine based on the prompt from the first user account and the at least two context items;

output the response to the first user account and appending the first response to the conversation thread stored in the smart folder;

receive a prompt from the second user account and a selection of the smart folder;

send the prompt from the second user account to the generative response engine with the at least two context items and a personalization state of the second user account; and receive a second response output by the generative response engine based on the prompt from the second user account and the at least two context items, wherein the second response is personalized to the second user account based on the personalization state of the second user account.

7. The computing system of claim 6, wherein the smart folder is one of a set of smart folders organized in a nested hierarchy.

8. The computing system of claim 7, wherein the at least two context items comprises at least one instruction inherited from a parent folder of the smart folder and wherein the at least one instruction informs the generative response engine how to respond to a prompt.

9. The computing system of claim 8, wherein the smart folder includes at least one sub-folder, wherein the at least one sub-folder inherits the at least one instruction from the parent folder of the smart folder and at least one instruction of the smart folder.

10. The computing system of claim 9, wherein the instructions further configure the computing system to:

provide, to the generative response engine, the at least one instruction from the parent folder and the at least one instruction from the smart folder, wherein a hierarchy of the at least one instruction from the parent folder and the at least one instruction from the smart folder is imputed from nesting of the smart folder in the parent folder.

11. The computing system of claim 6, wherein the at least two context items comprises one or more documents stored as vectors in the smart folder.

12. The computing system of claim 11, wherein the response from the generative response engine is aided using retrieval-augmented generation (RAG) over the one or more documents.

13. A non-transitory computer-readable medium comprising instructions that when executed by at least one processor, cause the at least one processor to:

receive a selection of a smart folder by a first user account, wherein the smart folder groups at least two context items that are usable by a generative response engine in responding to prompts, wherein one of the at least two context items is a conversation thread between at least one user account and the generative response engine, and wherein the smart folder is associated with access privileges that grant access to the smart folder to the first user account and a second user account;

receive a prompt from the first user account;

send the prompt from the first user account and the at least two context items to the generative response engine;

receive a response output by the generative response engine based on the prompt from the first user account and the at least two context items;

output the response to the user account and appending the response to the conversation thread stored in the smart folder;

receive a prompt from the second user account and a selection of the smart folder;

send the prompt from the second user account to the generative response engine with the at least two context items and a personalization state of the second user account; and receive a second response output by the generative response engine based on the prompt from the second user account and the at least two context items, wherein the second response is personalized to the second user account based on the personalization state of the second user account.

14. The non-transitory computer-readable medium of claim 13, wherein the at least two context items comprises at least two of: the conversation thread, a collaborative document, a knowledge base document, and an instruction to the generative response engine.

15. The non-transitory computer-readable medium of claim 14, wherein the instructions further configure the at least one processor to:

send a first user account personalization state to the generative response engine with the at least two context items, wherein the first user account personalization state is included in a context window of the generative response engine with the at least two context items.

16. The non-transitory computer-readable medium of claim 14, wherein the smart folder is one of a set of smart folders organized in a nested hierarchy.

17. The non-transitory computer-readable medium of claim 16, wherein the at least two context items comprises at least one instruction inherited from a parent folder of the smart folder and wherein the at least one instruction informs the generative response engine how to respond to a prompt.

18. The non-transitory computer-readable medium of claim 17, wherein the smart folder includes at least one sub-folder, wherein the at least one sub-folder inherits the at least one instruction from the parent folder of the smart folder and at least one instruction of the smart folder.

19. The non-transitory computer-readable medium of claim 18, wherein the instructions further configure the at least one processor to:

provide, to the generative response engine, the at least one instruction from the parent folder and the at least one instruction from the smart folder, wherein a hierarchy of the at least one instruction from the parent folder and the at least one instruction from the smart folder is imputed from nesting of the smart folder in the parent folder.

\*  \*  \*  \*  \*